US012445874B2

(12) United States Patent
Shrestha et al.

(10) Patent No.: US 12,445,874 B2
(45) Date of Patent: Oct. 14, 2025

(54) PERFORMING MEASUREMENTS OF FREQUENCIES ASSOCIATED WITH TERRESTRIAL NETWORK CELLS

(71) Applicant: QUALCOMM Incorporated, San Diego, CA (US)

(72) Inventors: Bharat Shrestha, San Diego, CA (US); Umesh Phuyal, San Diego, CA (US); Changhwan Park, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/662,601

(22) Filed: May 9, 2022

(65) Prior Publication Data

US 2023/0362692 A1    Nov. 9, 2023

(51) Int. Cl.
*H04W 24/08* (2009.01)
*H04B 7/185* (2006.01)
*H04W 48/08* (2009.01)

(52) U.S. Cl.
CPC ........ *H04W 24/08* (2013.01); *H04B 7/18513* (2013.01); *H04W 48/08* (2013.01)

(58) Field of Classification Search
CPC ... H04B 7/18513; H04W 24/08; H04W 48/08
See application file for complete search history.

(56) References Cited

U.S. PATENT DOCUMENTS

| | | | |
|---|---|---|---|
| 2017/0006510 A1* | 1/2017 | Kaikkonen | H04W 48/16 |
| 2020/0252823 A1* | 8/2020 | Kim | H04W 48/16 |
| 2021/0068013 A1* | 3/2021 | Cheng | H04W 48/18 |
| 2021/0105647 A1* | 4/2021 | Lee | H04W 36/0094 |
| 2021/0377849 A1* | 12/2021 | Xu | H04W 36/36 |
| 2022/0070812 A1* | 3/2022 | Cheng | H04W 60/04 |
| 2022/0141751 A1* | 5/2022 | Yao | H04W 28/0861 370/331 |
| 2022/0225265 A1* | 7/2022 | Jeong | H04W 76/20 |
| 2022/0264384 A1 | 8/2022 | Lee et al. | |

(Continued)

FOREIGN PATENT DOCUMENTS

| | | |
|---|---|---|
| EP | 3962170 A1 | 3/2022 |
| EP | 4013118 A1 | 6/2022 |

(Continued)

OTHER PUBLICATIONS

International Search Report and Written Opinion—PCT/US2023/021029—ISA/EPO—Jul. 19, 2023.

*Primary Examiner* — Melanie Jagannathan
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity and via a system information block (SIB), information that indicates frequencies associated with a terrestrial network (TN) cell. The information may include one or more of a priority of frequency, frequency-specific offset, or cell-specific offset. The UE may perform, during an idle mode of the UE, measurements of the frequencies associated with the TN cell based at least in part on a location of the UE being within the TN cell. Numerous other aspects are described.

30 Claims, 14 Drawing Sheets

(56) References Cited

U.S. PATENT DOCUMENTS

| | | | | |
|---|---|---|---|---|
| 2023/0179293 | A1* | 6/2023 | Hwang | H04W 48/16 |
| | | | | 455/12.1 |
| 2023/0217398 | A1* | 7/2023 | Kim | H04B 7/06964 |
| | | | | 370/503 |
| 2023/0276296 | A1* | 8/2023 | Kim | H04W 28/0278 |
| | | | | 370/235 |
| 2023/0344508 | A1* | 10/2023 | Tseng | H04W 56/005 |
| 2023/0345328 | A1* | 10/2023 | Nishant | H04W 36/08 |
| 2023/0354138 | A1* | 11/2023 | Leng | H04W 48/20 |
| 2023/0370876 | A1* | 11/2023 | Jeong | H04W 8/24 |
| 2023/0422125 | A1* | 12/2023 | Jeong | H04W 36/322 |
| 2024/0063894 | A1* | 2/2024 | Vogedes | H04B 7/1851 |
| 2024/0147283 | A1* | 5/2024 | Hu | H04W 24/10 |
| 2024/0147564 | A1* | 5/2024 | Sogabe | H04W 76/20 |
| 2024/0172056 | A1* | 5/2024 | He | H04W 36/0088 |
| 2024/0214849 | A1* | 6/2024 | Bergström et al. | |
| | | | | H04W 36/0085 |
| 2024/0260052 | A1* | 8/2024 | Zhang | H04W 72/231 |
| 2025/0119780 | A1* | 4/2025 | Chen | H04W 56/0045 |
| 2025/0168751 | A1* | 5/2025 | Tao | H04W 48/16 |

FOREIGN PATENT DOCUMENTS

| | | |
|---|---|---|
| WO | 2020092566 A1 | 5/2020 |
| WO | 2021029686 A1 | 2/2021 |
| WO | 2021066447 A1 | 4/2021 |

* cited by examiner

PERFORMING MEASUREMENTS OF FREQUENCIES ASSOCIATED WITH TERRESTRIAL NETWORK CELLS

FIELD OF THE DISCLOSURE

Aspects of the present disclosure generally relate to wireless communication and to techniques and apparatuses for performing measurements of frequencies associated with terrestrial network (TN) cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network entity and via a system information block (SIB), information that indicates frequencies associated with a terrestrial network (TN) cell, wherein the information includes one or more of a priority of frequency, frequency-specific offset, or cell-specific offset; and perform, during an idle mode of the UE, measurements of the frequencies associated with the TN cell based at least in part on a location of the UE being within the TN cell.

In some implementations, an apparatus for wireless communication at a UE includes a memory and one or more processors, coupled to the memory, configured to: receive, from a network entity, an indication of frequencies associated with a TN cell; attempt, during an idle mode of the UE, to perform measurements of the frequencies associated with the TN cell; and disable subsequent attempts to perform the measurements of the frequencies associated with the TN cell based at least in part on a condition being satisfied, wherein the condition is associated with one or more of a TN cell detection, a defined period of time, or a UE location.

In some implementations, an apparatus for wireless communication at a UE includes a memory and one or more processors, coupled to the memory, configured to: receive, from a network entity, an indication of frequencies associated with a TN cell; receive, from the network entity, a cell coverage indication, wherein the cell coverage indication includes information regarding a plurality of sub-areas within a cell; and perform, during an idle mode of the UE, measurements of the frequencies associated with the TN cell based at least in part on the cell coverage indication and a location of the UE within one of the plurality of sub-areas within the cell.

In some implementations, a method of wireless communication performed by a UE includes receiving, from a network entity and via a SIB, information that indicates frequencies associated with a TN cell, wherein the information includes one or more of a priority of frequency, frequency-specific offset, or cell-specific offset; and performing, during an idle mode of the UE, measurements of the frequencies associated with the TN cell based at least in part on a location of the UE being within the TN cell.

In some implementations, a method of wireless communication performed by a UE includes receiving, from a network entity, an indication of frequencies associated with a TN cell; attempting, during an idle mode of the UE, to perform measurements of the frequencies associated with the TN cell; and disabling subsequent attempts to perform the measurements of the frequencies associated with the TN cell based at least in part on a condition being satisfied, wherein the condition is associated with one or more of a TN cell detection, a defined period of time, or a UE location.

In some implementations, a method of wireless communication performed by a UE includes receiving, from a network entity, an indication of frequencies associated with a TN cell; receiving, from the network entity, a cell coverage indication, wherein the cell coverage indication includes information regarding a plurality of sub-areas within a cell; and performing, during an idle mode of the UE, measurements of the frequencies associated with the TN cell based at least in part on the cell coverage indication and a location of the UE within one of the plurality of sub-areas within the cell.

In some implementations, a non-transitory computer-readable medium storing a set of instructions for wireless communication includes one or more instructions that, when executed by one or more processors of a UE, cause the UE to: receive, from a network entity and via a SIB, information that indicates frequencies associated with a TN cell, wherein the information includes one or more of a priority of frequency, frequency-specific offset, or cell-specific offset; and perform, during an idle mode of the UE, measurements of the frequencies associated with the TN cell based at least in part on a location of the UE being within the TN cell.

In some implementations, a non-transitory computer-readable medium storing a set of instructions for wireless communication includes one or more instructions that, when executed by one or more processors of a UE, cause the UE to: receive, from a network entity, an indication of frequencies associated with a TN cell; attempt, during an idle mode of the UE, to perform measurements of the frequencies associated with the TN cell; and disable subsequent attempts to perform the measurements of the frequencies associated with the TN cell based at least in part on a condition being satisfied, wherein the condition is associated with one or more of a TN cell detection, a defined period of time, or a UE location.

In some implementations, a non-transitory computer-readable medium storing a set of instructions for wireless communication includes one or more instructions that, when executed by one or more processors of a UE, cause the UE to: receive, from a network entity, an indication of frequencies associated with a TN cell; receive, from the network entity, a cell coverage indication, wherein the cell coverage indication includes information regarding a plurality of sub-areas within a cell; and perform, during an idle mode of the UE, measurements of the frequencies associated with the TN cell based at least in part on the cell coverage indication and a location of the UE within one of the plurality of sub-areas within the cell.

In some implementations, an apparatus for wireless communication includes means for receiving, from a network entity and via a SIB, information that indicates frequencies associated with a TN cell, wherein the information includes one or more of a priority of frequency, frequency-specific offset, or cell-specific offset; and means for performing, during an idle mode of the apparatus, measurements of the frequencies associated with the TN cell based at least in part on a location of the apparatus being within the TN cell.

In some implementations, an apparatus for wireless communication includes means for receiving, from a network entity, an indication of frequencies associated with a TN cell; means for attempting, during an idle mode of the apparatus, to perform measurements of the frequencies associated with the TN cell; and means for disabling subsequent attempts to perform the measurements of the frequencies associated with the TN cell based at least in part on a condition being satisfied, wherein the condition is associated with one or more of a TN cell detection, a defined period of time, or a UE location.

In some implementations, an apparatus for wireless communication includes means for receiving, from a network entity, an indication of frequencies associated with a TN cell; means for receiving, from the network entity, a cell coverage indication, wherein the cell coverage indication includes information regarding a plurality of sub-areas within a cell; and means for performing, during an idle mode of the apparatus, measurements of the frequencies associated with the TN cell based at least in part on the cell coverage indication and a location of the apparatus within one of the plurality of sub-areas within the cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
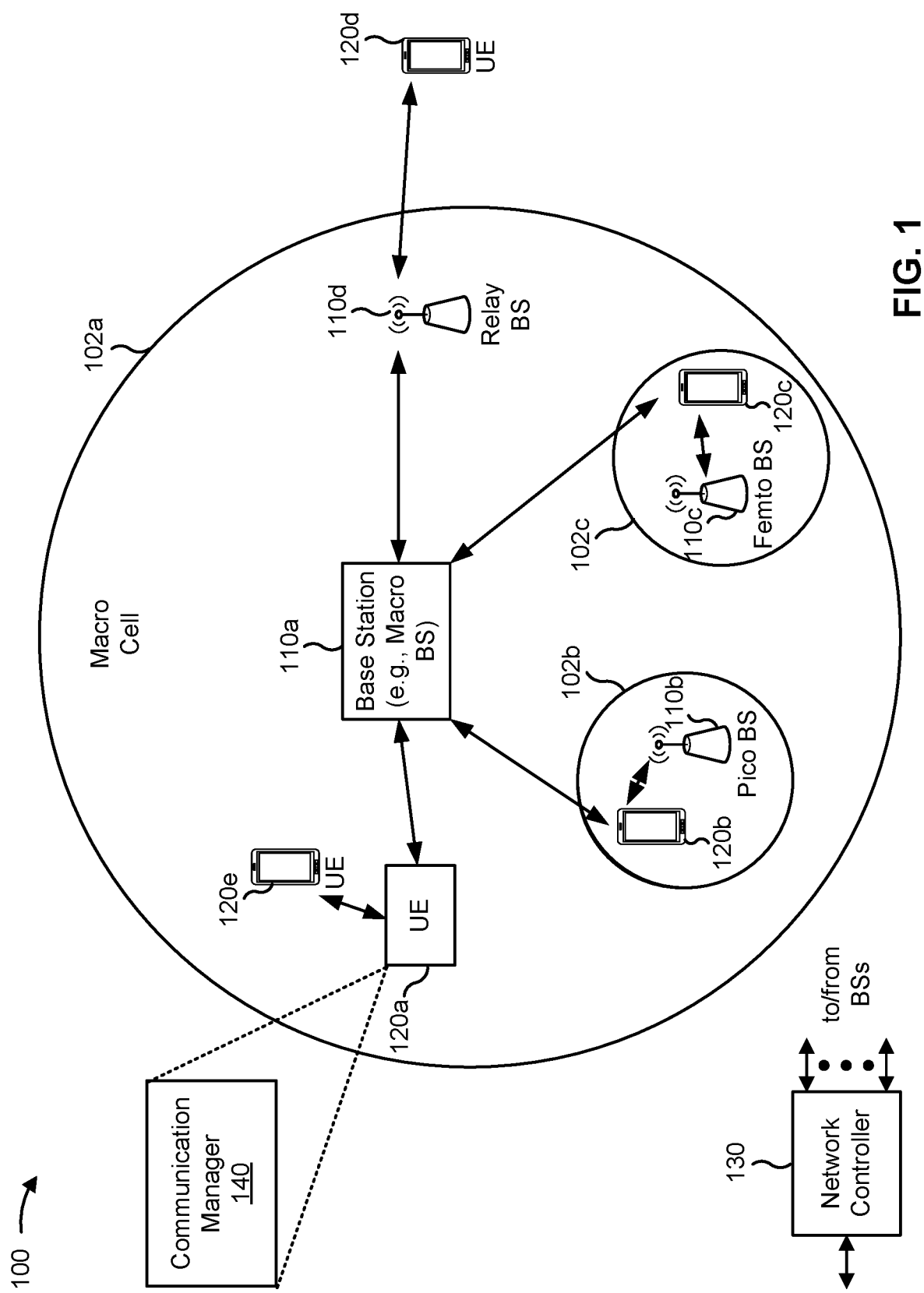
FIG. 1 is a diagram illustrating an example of a wireless network, in accordance with the present disclosure.

A UE, during an idle/inactive mode, may perform measurements associated with a plurality of cells. The plurality of cells may include terrestrial network (TN) cells and/or non-terrestrial network (NTN) cells. TN cells may have a better performance (e.g., in terms of data rate) as compared to NTN cells, so frequencies associated with TN cells may have a higher priority than frequencies associated with NTN cells. For example, during the idle/inactive mode, measurements of frequencies associated with TN cells may be prioritized in relation to measurements of frequencies associated with NTN cells. The UE may be configured to always perform the measurements of frequencies associated with TN cells, even when a signal strength associated with an NTN cell is relatively high, based at least in part on the higher priority of the frequencies associated with TN cells. The UE may periodically perform the measurements of the frequencies associated with the TN cells, even when signal strengths associated with the TN cells do not satisfy a threshold.

One problem is that NTN cells may be very large in area as compared to the TN cells. The NTN cells may cover a relatively large area in which some parts have TN cell coverage, but other parts do not have TN cell coverage. In some cases, the NTN cells may cover large areas in which there is no TN cell coverage. However, since the frequencies associated with the TN cells may have the higher priority than the frequencies associated with the NTN cells, the UE may consume excessive power by unnecessarily searching the frequencies associated with the TN cells when the UE is within one of the NTN cells. In other words, the UE may be located within an NTN cell spanning an area of hundreds of miles, and with no TN cell coverage, but the UE may still attempt to perform the measurements of the frequencies associated with the TN cells based at least in part on the higher priority of frequencies associated with TN cells, which may unnecessarily consume power at the UE.

In some aspects, the UE may receive, from a network entity, information that indicates frequencies associated with a TN cell. The information may be a list of the frequencies associated with the TN cell. The information may directly indicate the frequencies associated with the TN cell. Alternatively, the information may indirectly indicate the frequencies associated with the TN cell. In other words, the UE may use the information to determine the frequencies associated with the TN cell. The UE may perform, during an idle mode of the UE, measurements of the frequencies associated with the TN cell when the UE is located within the TN cell. The UE may receive, from the network entity, TN cell coverage information that indicates coordinate information associated with the TN cell, and the UE may determine the location of the UE in relation to the TN cell using the TN cell coverage information. The UE may not perform measurements of the frequencies associated with the TN cells when the location of the UE is not within one of the TN cells, which may reduce power consumption at the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network entity and via a system information block (SIB), information that indicates frequencies associated with a TN cell, wherein the information includes one or more of a priority of frequency, frequency-specific offset, or cell-specific offset; and perform, during an idle mode of the UE, measurements of the frequencies associated with the TN cell based at least in part on a location of the UE being within the TN cell. Additionally, or alternatively, the communication manager 140 may perform one or more other operations described herein.

In some aspects, as described in more detail elsewhere herein, the communication manager 140 may receive, from a network entity, an indication of frequencies associated with a TN cell; attempt, during an idle mode of the UE, to perform measurements of the frequencies associated with the TN cell; and disable subsequent attempts to perform the measurements of the frequencies associated with the TN cell based at least in part on a condition being satisfied, wherein the condition is associated with one or more of a TN cell detection, a defined period of time, or a UE location. Additionally, or alternatively, the communication manager 140 may perform one or more other operations described herein.

In some aspects, as described in more detail elsewhere herein, the communication manager 140 may receive, from a network entity, an indication of frequencies associated with a TN cell; receive, from the network entity, a cell coverage indication, wherein the cell coverage indication includes information regarding a plurality of sub-areas within a cell; and perform, during an idle mode of the UE, measurements of the frequencies associated with the TN cell based at least in part on the cell coverage indication and a location of the UE within one of the plurality of sub-areas within the cell. Additionally, or alternatively, the communication manager 140 may perform one or more other operations described herein.

As indicated above, FIG. 1 is provided as an example. Other examples may differ from what is described with regard to FIG. 1.

Figure 2:
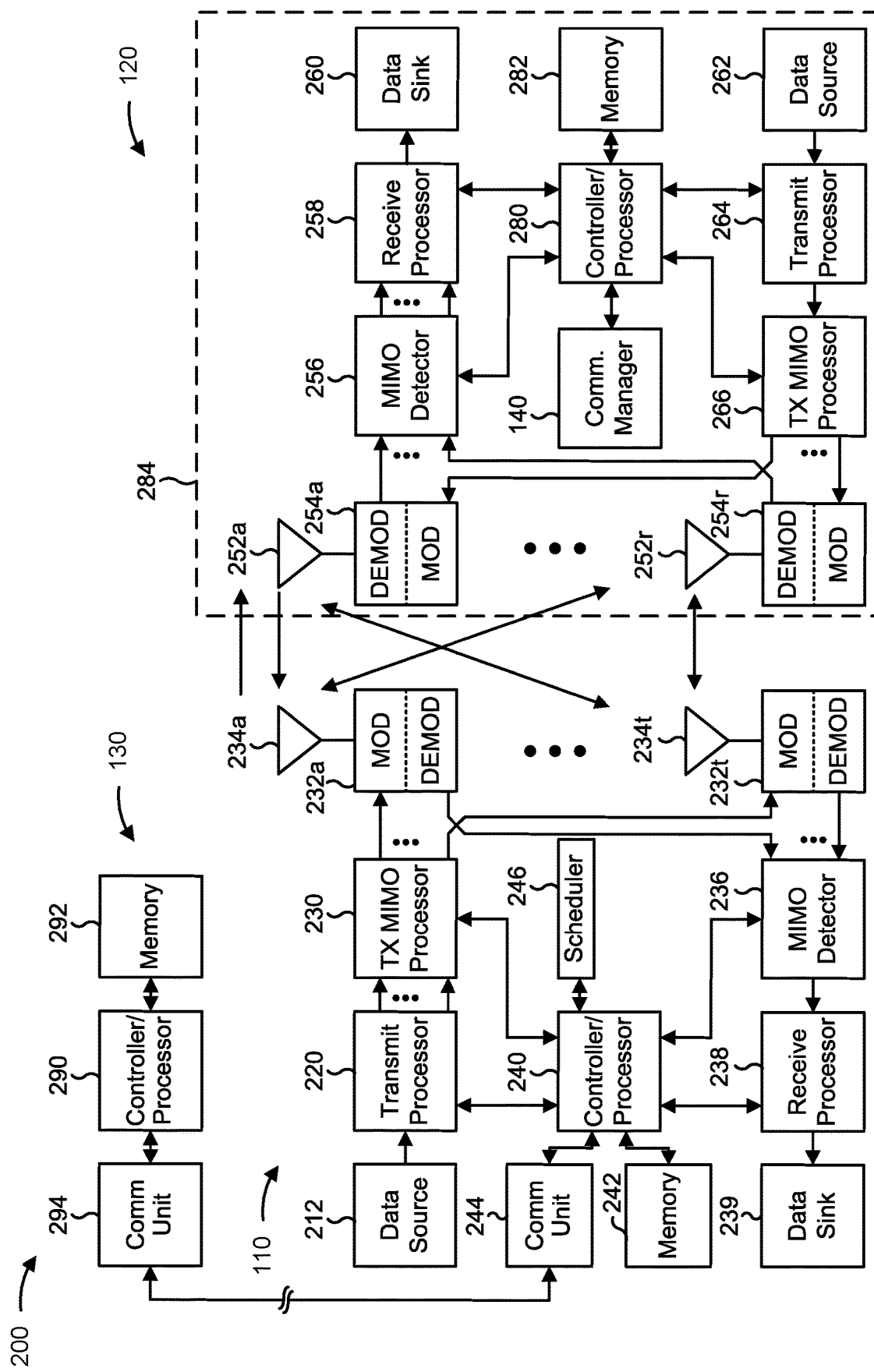
FIG. 2 is a diagram illustrating an example of a base station in communication with a user equipment (UE) in a wireless network, in accordance with the present disclosure.

FIG. 2 is a diagram illustrating an example of a base station 110 in communication with a UE 120 in a wireless network 200, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with performing measurements of frequencies associated with TN cells, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity and via a SIB, information that indicates frequencies associated with a TN cell, wherein the information includes one or more of a priority of frequency, frequency-specific offset, or cell-specific offset; and/or means for performing, during an idle mode of the UE, measurements of the frequencies associated with the TN cell based at least in part on a location of the UE being within the TN cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., UE 120) includes means for receiving, from a network entity, an indication of frequencies associated with a TN cell; means for attempting, during an idle mode of the UE, to perform measurements of the frequencies associated with the TN cell; and/or means for disabling subsequent attempts to perform the measurements of the frequencies associated with the TN cell based at least in part on a condition being satisfied, wherein the condition is associated with one or more of a TN cell detection, a defined period of time, or a UE location. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., UE 120) includes means for receiving, from a network entity, an indication of frequencies associated with a TN cell; means for receiving, from the network entity, a cell coverage indication, wherein the cell coverage indication includes information regarding a plurality of sub-areas within a cell; and/or means for performing, during an idle mode of the UE, measurements of the frequencies associated with the TN cell based at least in part on the cell coverage indication and a location of the UE within one of the plurality of sub-areas within the cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
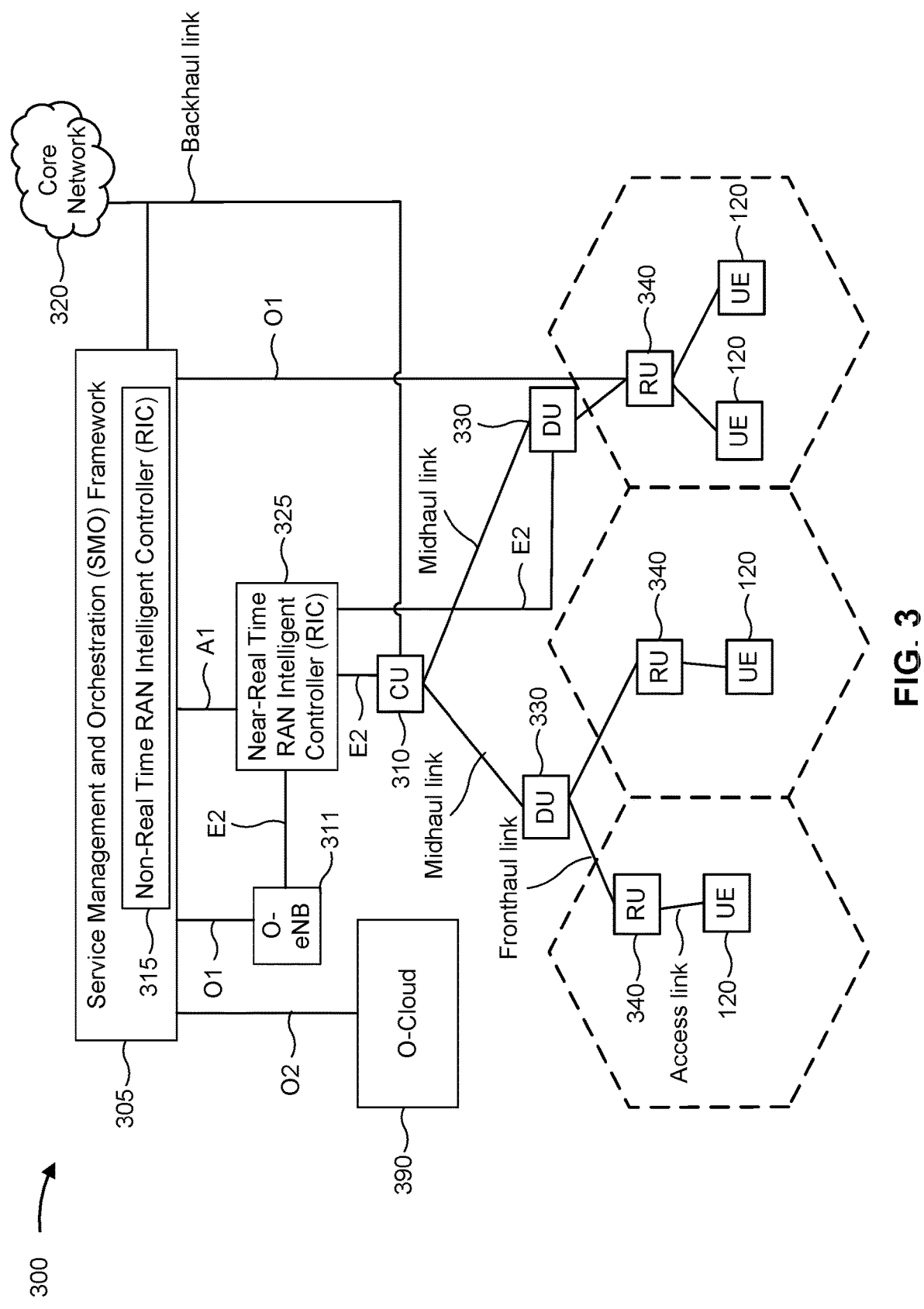
FIG. 3 is a diagram illustrating an example of a disaggregated base station architecture, in accordance with the present disclosure.

FIG. 3 is a diagram illustrating an example of a disaggregated base station architecture 300, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual centralized unit (VCU), a virtual distributed unit (VDU), or a virtual radio unit (VRU)).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
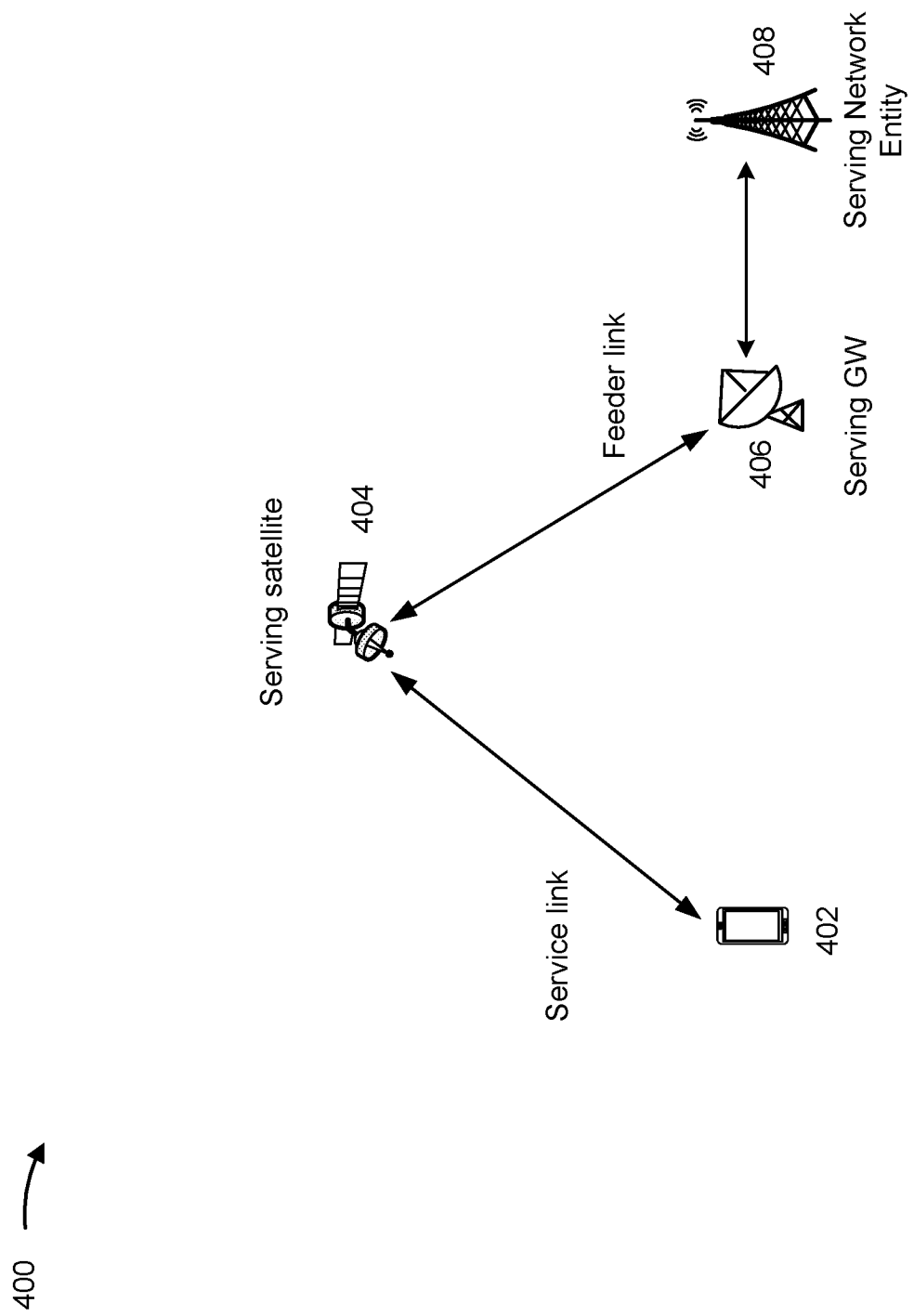
FIG. 4 is a diagram illustrating an example of a non-terrestrial network (NTN) architecture, in accordance with the present disclosure.

FIG. 4 is a diagram illustrating an example of an NTN architecture 400, in accordance with the present disclosure.

As shown in FIG. 4, a UE 402 in a connected mode may communicate with a serving network entity 408 via a serving satellite 404 in the NTN architecture 400. The UE 402 may transmit an uplink transmission to the serving satellite 404. The serving satellite 404 may relay the uplink transmission to the serving network entity 408 via a serving gateway 406. The serving network entity 408 may transmit a downlink transmission to the serving satellite 404 via the serving gateway 406. The serving satellite 404 may relay the downlink transmission to the UE 402. A link between the UE 402 and the serving satellite 404 may be a service link, and a link between the serving satellite 404 and the serving gateway 406 may be a feeder link.

As indicated above, FIG. 4 is provided as an example. Other examples may differ from what is described with regard to FIG. 4.

Figures 5A, 5B:
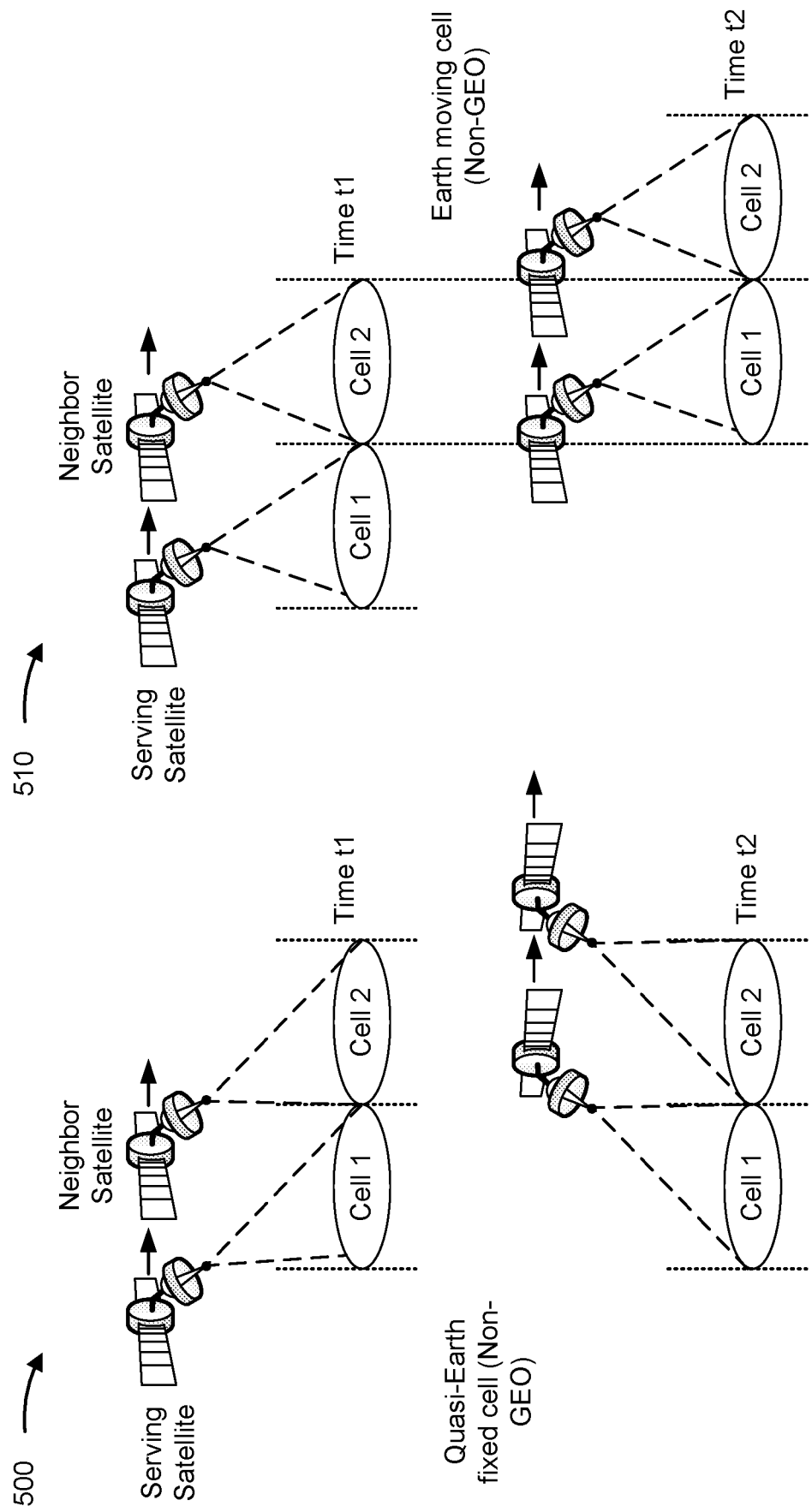
FIGS. 5A and 5B are diagrams illustrating examples of NTN architectures for non-geostationary satellites, in accordance with the present disclosure.

FIGS. 5A and 5B are diagrams illustrating examples of NTN architectures 500, 510, respectively, for non-geostationary satellites, in accordance with the present disclosure.

A UE configured to operate in an NTN architecture (or NTN configuration or NTN deployment) may be equipped with a global navigation satellite system (GNSS). The UE may be configured with measurement and mobility related parameters based at least in part on an assumption that the UE is located at a center of a beam footprint (e.g., a center of a cell).

As shown in FIG. 5A, the NTN architecture 500 may be associated with a quasi-Earth fixed cell deployment for a non-geostationary satellite. For the quasi-Earth fixed cell deployment, a beam footprint (or cell) may be Earth fixed, in which case a beam pointing mechanism may compensate for the mobility of the non-geostationary satellite. In other words, even though the satellite may move over time, the beam footprint may remain fixed on Earth based at least in part on the beam pointing mechanism. The beam footprint, which may be associated with a cell, may not move as the non-geostationary satellite moves over the Earth. The beam pointing mechanism may be associated with a mechanical or electronic steering feature, which may allow the non-geostationary satellite to steer the beam footprint as the non-geostationary satellite moves over the Earth.

As shown in FIG. 5B, the NTN architecture 510 may be associated with an Earth moving cell deployment for the non-geostationary satellite. For the Earth moving cell deployment, a beam footprint may be moving over the Earth with the non-geostationary satellite motion. The beam footprint may move over the Earth with the non-geostationary satellite.

As indicated above, FIGS. 5A and 5B are provided as examples. Other examples may differ from what is described with regard to FIGS. 5A and 5B.

A UE, during an RRC idle/inactive mode, may perform measurements associated with a plurality of cells (e.g., a serving cell and/or neighbor cells). The UE may monitor a control channel during the RRC idle/inactive mode. The UE may receive, via the control channel, control signals from the plurality of cells, and the UE may determine the measurements based at least in part on the control signals. The UE may select another cell, from the plurality of cells, based at least in part on the measurements, and then perform a registration with the selected cell. For example, the UE may determine that a second cell is associated with a higher measured signal strength as compared to a first cell (e.g., the serving cell), and then the UE may perform a registration with the second cell. The UE, based at least in part on a cell reselection, may connect to the second cell and disconnect from the first cell.

The plurality of cells may include TN cells and/or NTN cells. For example, the serving cell may be a TN cell and a neighbor cell may be an NTN cell, or vice versa. TN cells may have a better performance (e.g., in terms of data rate) as compared to NTN cells, so frequencies associated with TN cells may have a higher priority than frequencies associated with NTN cells. For example, during the RRC idle/inactive mode, measurements of frequencies associated with TN cells may be prioritized in relation to measurements of frequencies associated with NTN cells. The UE may be configured to always perform the measurements of frequencies associated with TN cells, even when a signal strength associated with an NTN cell is relatively high, based at least in part on the higher priority of the frequencies associated with TN cells. The UE may periodically perform the measurements of the frequencies associated with the TN cells, even when signal strengths associated with the TN cells do not satisfy a threshold.

The NTN cells may be very large in area as compared to the TN cells. For example, the NTN cells may be hundreds of miles in area, whereas the TN cells may be a few miles in area. The NTN cells may cover a relatively large area with different landscapes (e.g., urban area, ocean, mountains), in which some parts have TN cell coverage, but other parts do not have TN cell coverage. In some cases, the NTN cells may cover large areas in which there is no TN cell coverage. However, since the frequencies associated with the TN cells may have the higher priority than the frequencies associated with the NTN cells, the UE may consume excessive power by unnecessarily searching the frequencies associated with the TN cells when the UE is within one of the NTN cells. In other words, the UE may be located within an NTN cell spanning an area of hundreds of miles, and with no TN cell coverage, but the UE may still attempt to perform the measurements of the frequencies associated with the TN cells based at least in part on the higher priority of frequencies associated with TN cells, which may unnecessarily consume power at the UE.

Figure 6:
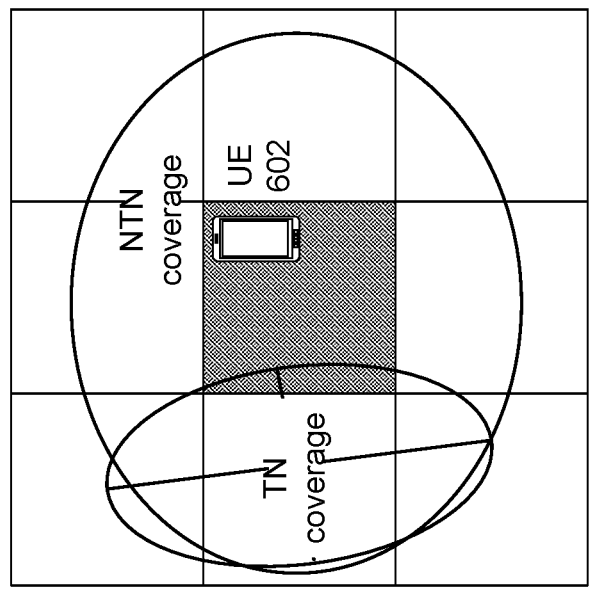
FIG. 6 is a diagram illustrating an example of a terrestrial network (TN) cell search, in accordance with the present disclosure.

FIG. 6 is a diagram illustrating an example of a TN cell search 600, in accordance with the present disclosure.

As shown in FIG. 6, a UE 602 may be located within an NTN cell. A portion of the NTN cell may be associated with TN cell coverage, whereas other portions of the NTN cell may not be associated with TN cell coverage. Since the NTN cell may be hundreds of miles in diameter, portions of the NTN cell which do not have TN cell coverage may be ocean, mountains, or other remote areas. However, due to the higher priority of frequencies associated with TN cells in relation to frequencies associated with NTN cells, when the UE 602 is located within the NTN cell, the UE 602 may still search for the frequencies associated with TN cells, which may unnecessarily consume power at the UE 602. In other words, the UE 602 may still search for TN cells when outside of TN cell coverage.

As indicated above, FIG. 6 is provided as an example. Other examples may differ from what is described with regard to FIG. 6.

In various aspects of techniques and apparatuses described herein, the UE may receive, from a network entity and via a SIB, information that indicates frequencies associated with a TN cell. The information may be a list of the frequencies associated with the TN cell. The UE may perform, during an idle mode of the UE, measurements of the frequencies associated with the TN cell based at least in part on a location of the UE being within the TN cell. The UE may receive, from the network entity, TN cell coverage information that indicates coordinate information associated with the TN cell, where the location of the UE in relation to the TN cell may be based at least in part on the TN cell coverage information. In some aspects, the information that indicates the frequencies associated with the TN cell may enable the UE to determine which frequencies are associated with TN cells versus which frequencies are associated with NTN cells. The UE may not perform measurements of the frequencies associated with the TN cells when the location of the UE is not within one of the TN cells, which may reduce power consumption at the UE.

Figure 7:
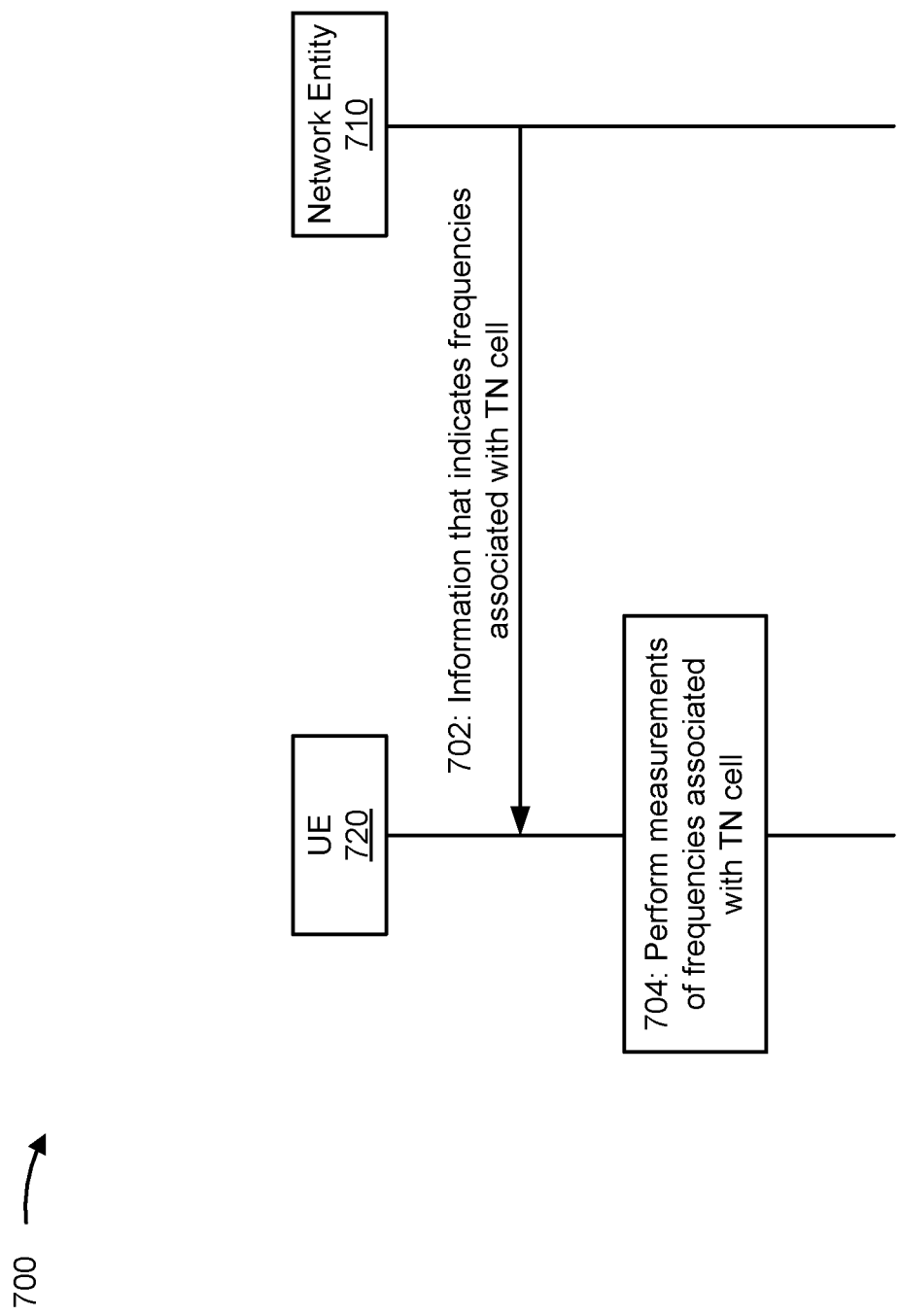
FIGS. 7-10 are diagrams illustrating examples associated with performing measurements of frequencies associated with TN cells, in accordance with the present disclosure.

FIG. 7 is a diagram illustrating an example associated with performing measurements of frequencies associated with TN cells 700, in accordance with the present disclosure. As shown in FIG. 7, communication may occur between a UE 720 (e.g., UE 120) and a network entity 710 (e.g., base station 110). In some aspects, the UE 720 and the network entity 710 may be included in a wireless network, such as wireless network 100.

In some aspects, the UE 720 may receive, from the network entity 710, TN cell coverage information. The TN cell coverage information may indicate TN cell coordinates, a TN cell radius, and/or a TN cell center. The UE 720 may determine whether a current location of the UE 720 is within a TN cell based at least in part on the TN cell coverage information. In other words, the UE 720 may determine whether the UE 720 is within coverage of the TN cell. When the UE 720 is within the TN cell, the UE 720 may search for frequencies associated with TN cells. When the UE 720 is not within the TN cell (e.g., the UE 720 is within an NTN cell), the UE 720 may not search for frequencies associated with TN cells, which may save power consumption at the UE 720. The UE 720 may use various mechanisms for determining which frequencies are associated with TN cells, as described in further detail below.

As shown by reference number 702, the UE 720 may receive, from the network entity 710 and via a SIB, information that indicates frequencies associated with a TN cell, where the information may include a priority of frequency, frequency-specific offset, and/or cell-specific offset. The information may directly indicate the frequencies associated with a TN cell. Alternatively, the information may indirectly indicate the frequencies associated with a TN cell. The frequencies may be inter-frequencies and/or intra-frequencies. In some aspects, the SIB may be a SIB type 3 (SIB3) or a SIB type 4 (SIB4), and the information may be a list of the frequencies associated with the TN cell.

In some aspects, the UE 720 may receive, from the network entity 710, the SIB, such as the SIB3 or SIB4. The SIB3 or SIB4 may indicate the list of frequencies, which may include frequencies associated with TN cells and/or frequencies associated with NTN cells. The list of frequencies may include intra-frequencies and/or inter-frequencies. For example, a TN cell indication may be added in the list of intra-frequencies and/or inter-frequencies in the SIB3 or SIB4. As a result, the UE 720 may be able to determine which frequencies are associated with TN cells.

In some aspects, the UE 720 may receive, from the network entity 710, the SIB, where the SIB may be an NTN-specific SIB. The information may indicate a list of satellites and an index of frequencies. Frequencies from the index of frequencies that correspond to satellites from the list of satellites may be indicative of frequencies associated with NTN cells. The frequencies associated with the TN cell may be derived based at least in part on the frequencies associated with the NTN cells.

In some aspects, the UE 720 may receive, from the network entity 710, an NTN-specific SIB (e.g., a SIBxy). The NTN-specific SIB may indicate NTN-specific information, such as a satellite list and/or ephemeris information. The satellite list may be a list of neighbor satellites. When the satellite list is provided in the NTN-specific SIB, the NTN-specific SIB may also indicate an index of frequencies, which are currently being broadcast from SIB3 or SIB4. The index of frequencies may be for intra-frequencies and/or inter-frequencies. The UE 720 may compare the satellite list with the index of frequencies, and based at least in part on the comparison, the UE 720 may determine which frequencies (e.g., from those frequencies being broadcast from SIB3 or SIB4) are associated with NTN cells (or satellites) and which frequencies are not associated with NTN cells. The frequencies that are not associated with NTN cells may be associated with TN cells. As a result, the UE 720 may be able to determine which frequencies are associated with TN cells.

In some aspects, the UE 720 may receive, from the network entity 710, the information, where the information may be a list of frequencies and corresponding priority values. Frequencies from the list of frequencies having priority values that satisfy a threshold may correspond to the frequencies associated with the TN cells.

In some aspects, the UE 720 may receive, from the network entity 710, a SIB that indicates the list of frequencies, where the frequencies may be associated with TN cells or NTN cells based at least in part on a frequency priority. In other words, an existing frequency priority may be used to indicate TN cells. As an example, a highest priority value (e.g., a priority value of 7, from a range of 1-7) may never be assigned to frequencies associated with NTN cells. Rather, the highest priority value may be assigned (e.g., always assigned) to frequencies associated with TN cells. As another example, a range of priority values (e.g., priority values 6 and 7) may be assigned (e.g., always assigned) to frequencies associated with TN cells (or TN cells). As a result, depending on a priority associated with a certain frequency, the UE 720 may be able to determine whether or not that frequency is associated with a TN cell.

In some aspects, the UE 720 may receive, from the network entity 710, the information, where the information may be a list of frequencies and corresponding sub-priority values. A sub-priority may be an additional layer of priority information. The sub-priority values may be used for the frequencies associated with the TN cell. The sub-priority values may not be used for frequencies associated with non-terrestrial network cells.

In some aspects, the frequency priority may be a sub-priority, where the sub-priority may apply to frequencies associated with TN cells. The sub-priority may not apply to frequencies associated with NTN cells. The sub-priority, such as a cell reselection sub-priority (e.g., CellReselectionSubPriority) may apply only to frequencies associated with TN cells, and frequencies associated with NTN cells may not use a sub-priority.

In some aspects, the UE 720 may receive, from the network entity 710, the information, where the information may be a list of frequencies and corresponding offset ranges. The offset ranges may correspond to frequency-specific offsets or cell-specific offsets. Offset ranges that satisfy a threshold may correspond to the frequencies associated with the TN cells.

In some aspects, the UE 720 may receive, from the network entity 710, a SIB that indicates an offset range (e.g., Q-OffsetRange), which may indicate a frequency-specific offset or a cell-specific offset. The offset range may be used to indicate frequencies that are associated with TN cells. For example, some range values such as large positive offsets (e.g., 20 dB, 22 dB, or 24 dB) may not be used for frequencies associated with NTN cells (or for NTN cells). Rather, such large positive offsets may only be used for frequencies associated with TN cells. As a result, depending on the offset range, the UE 720 may be able to determine whether or not certain frequencies are associated with TN cells.

In some aspects, the UE 720 may receive, from the network entity 710, the information, where the information may indicate a RAT associated with the TN cell. The measurements of the frequencies associated with the TN cell may be based at least in part on the RAT associated with the TN cell being supported by the UE 720.

In some aspects, the SIB that indicates the frequencies associated with TN cells may also include an indication of a TN cell RAT type. Different TN cells may be associated with different types of RATs, such as NR, Universal Terrestrial Radio Access (UTRA), or Evolved Universal Mobile Telecommunications System (UMTS) Terrestrial Radio Access (E-UTRA). An NTN capable UE 720 may also support LTE and Global System for Mobile Communications (GSM). The indication of the TN cell RAT type may indicate whether or not the TN cell is NR. When the UE 720 does not support LTE/GSM, the UE 720 may not search for frequencies associated with TN cells having higher priority when the frequencies associated with TN cells are not NR frequencies. In other words, even when frequencies associated with TN cells have higher priority, the UE 720 may not search such frequencies when the frequencies are non-NR frequencies and the UE 720 does not support non-NR RATs (e.g., LTE/GSM), which may save power at the UE 720. For example, when the UE 720 supports an NR standalone, the UE 720 does not need to attempt to measure or detect frequencies associated with TN cells when a coverage broadcasted in a SIB is only for LTE TN cells.

As shown by reference number 704, the UE 720 may perform, during an idle mode of the UE 720, measurements of the frequencies associated with the TN cell. The UE 720 may perform the measurements of the frequencies associated with the TN cell based at least in part on a location of the UE 720 being within the TN cell. The UE may receive, from the network entity 710, TN cell coverage information that indicates coordinate information associated with the TN cell. The location of the UE 720 in relation to the TN cell may be based at least in part on the TN cell coverage information. When the location of the UE 720 is within the TN cell, the UE 720 may perform the measurements of the frequencies associated with the TN cell. When the location of the UE 720 is not within the TN cell (e.g., within an NTN cell), the UE 720 may not perform the measurements of the frequencies associated with the TN cell.

As indicated above, FIG. 7 is provided as an example. Other examples may differ from what is described with regard to FIG. 7.

Figure 8:
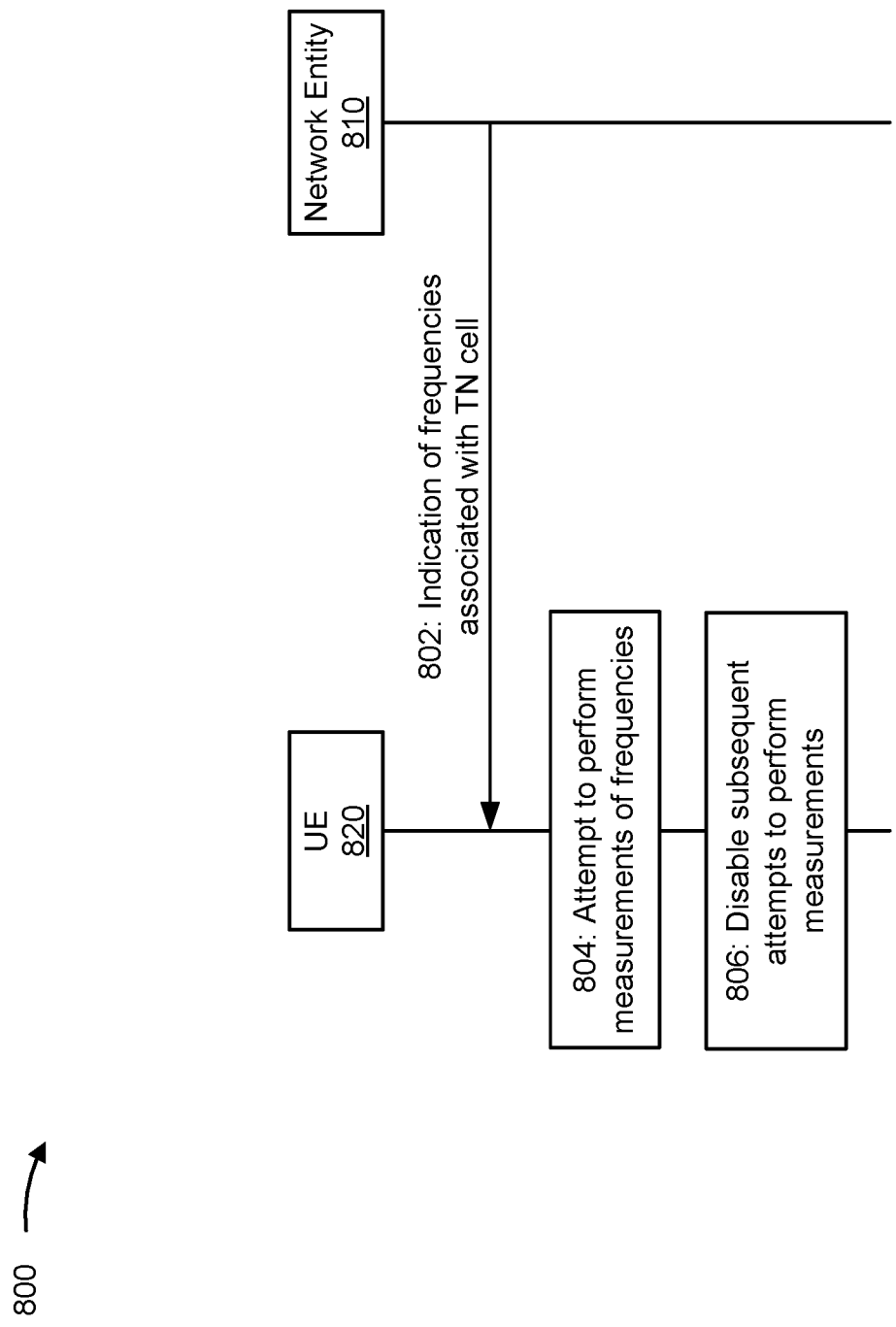

FIG. 8 is a diagram illustrating an example associated with performing measurements of frequencies associated with TN cells 800, in accordance with the present disclosure. As shown in FIG. 8, communication may occur between a UE 820 (e.g., UE 120) and a network entity 810 (e.g., base station 110). In some aspects, the UE 820 and the network entity 810 may be included in a wireless network, such as wireless network 100.

As shown by reference number 802, the UE 820 may receive, from the network entity 810, an indication of frequencies associated with a TN cell. The UE 820 may receive a SIB that includes the indication of frequencies associated with the TN cell. For example, the SIB may include a list of the frequencies associated with the TN cell.

In some aspects, the UE 820 may receive information that indicates the frequencies associated with the TN cell. In other words, the UE 820 may determine the frequencies associated with the TN cells based at least in part on the information. The UE 820 may receive a list of satellites and an index of frequencies, where frequencies from the index of frequencies that correspond to satellites from the list of satellites may be indicative of frequencies associated with NTN cells, and the frequencies associated with the TN cell may be derived based at least in part on the frequencies associated with NTN cells. The UE 820 may receive a list of frequencies and corresponding priority values, where frequencies from the list of frequencies having priority values that satisfy a threshold may correspond to the frequencies associated with the TN cells. The UE 820 may receive a list of frequencies and corresponding sub-priority values, where the sub-priority values may be used for the frequencies associated with the TN cell, and the sub-priority values may not be used for frequencies associated with NTN cells. The UE 820 may receive a list of frequencies and corresponding offset ranges, where the offset ranges may correspond to frequency-specific offsets or cell-specific offsets, and offset ranges that satisfy a threshold may correspond to the frequencies associated with the TN cells As shown by reference number 804, the UE 820 may attempt, during an idle mode of the UE 820, to perform measurements of the frequencies associated with the TN cell. The UE 820 may attempt to perform the measurements of the frequencies associated with the TN cell based at least in part on whether a synchronization signal block (SSB) is detected within the frequencies associated with the TN cell. When the UE 820 detects the SSB within a frequency associated with the TN cell, the UE 820 may perform a measurement of the SSB. When the UE 820 does not detect the SSB within the frequency associated with the TN cell (e.g., the TN cell is not detected), the UE 820 may be unable to perform the measurement of the SSB.

As shown by reference number 806, the UE 820 may disable subsequent attempts to perform the measurements of the frequencies associated with the TN cell based at least in part on a condition being satisfied, where the condition may be associated with a TN cell detection, a defined period of time, and/or a UE location. The UE 820 may disable the subsequent attempts based at least in part on the TN cell not being detected after a defined quantity of attempts. The UE 820 may disable the subsequent attempts based at least in part on the TN cell not being detected after a defined quantity of discontinuous reception (DRX) cycles. The UE 820 may disable the subsequent attempts for a defined period of time. The UE 820 may disable the subsequent attempts until the UE 820 moves a distance that satisfies a threshold. The UE 820 may disable the subsequent attempts when the UE location is at a distance from an initial location that satisfies the threshold. The UE 820 may reattempt to perform measurements of the frequencies associated with the TN cell based at least in part on a second condition being satisfied, where the second condition may be satisfied based at least in part on an expiry of the defined period of time or the UE 820 moving the distance that satisfies the threshold.

In some aspects, the UE 820 may perform the measurements of the frequencies associated with the TN cell based at least in part on a relaxed TN cell search procedure. The relaxed TN cell search procedure may involve disabling the subsequent attempts to perform the measurements of the frequencies associated with the TN cell regardless of the frequencies associated with the TN cell being associated with a high priority.

In some aspects, the UE 820 may not receive TN cell coverage information from the network entity 810, but the UE 820 may receive the SIB that indicates the list of frequencies, which may include the frequencies associated with TN cells. In this case, the UE 820 may implement a relaxed search procedure, which may save power at the UE. The UE 820 may implement the relaxed search procedure for frequencies associated with TN cells (or for TN cells) and not for frequencies associated with NTN cells, when the frequencies associated with the TN cells are indicated by the SIB.

In some aspects, during the relaxed search procedure, the UE 820 may attempt to detect the SSB in the frequency associated with the TN cell. After a certain quantity of attempts or after a certain quantity of DRX cycles, when no TN cell has been detected in the frequency, the UE 820 may disable a search of the frequency. In other words, when a quantity of search instances in which the UE 820 cannot detect an SSB in the frequency associated with the TN cell satisfies a threshold, the UE 820 may disable the search of the frequency associated with the TN cell. By disabling the search of the frequency associated with the TN cell, even though the frequency may be associated with a higher priority, the UE 820 may relax higher priority frequency measurement rules.

In some aspects, the UE 820 may determine to restart searching for the frequency associated with the TN cell after a predefined time period. The predefined time period may be a quantity of DRX cycles. In other words, after the time period has expired, the UE 820 may again start searching for the frequency associated with the TN cell, and if the frequency is not found after a quantity of search attempts, the UE 820 may again disable the search of the frequency. In some aspects, the UE 820 may determine to restart searching for the frequency associated with the TN cell (e.g., resume the higher priority frequency search) based at least in part on distance threshold criteria. For example, when the UE 820 moves by a distance threshold that satisfies the distance threshold criteria, the UE 820 may restart searching for the frequency associated with the TN cell. In other words, unless the UE 820 moves by the distance threshold, the UE 820 may not measure the frequency associated with the TN cell.

In some aspects, the UE 820 may implement the relaxed search procedure for a current highest priority frequency associated with a TN cell, and the relaxed search procedure may not be applied to lower priority frequencies associated with TN cells. In some aspects, a serving cell RSRP-based equal or lower priority frequency search may be used for higher priority frequencies associated with TN cells. Further, for a cell reselection when measurements associated with a serving cell no longer satisfy a threshold, the UE 820 may search the higher priority frequencies associated with TN cells.

As indicated above, FIG. 8 is provided as an example. Other examples may differ from what is described with regard to FIG. 8.

Figure 9:
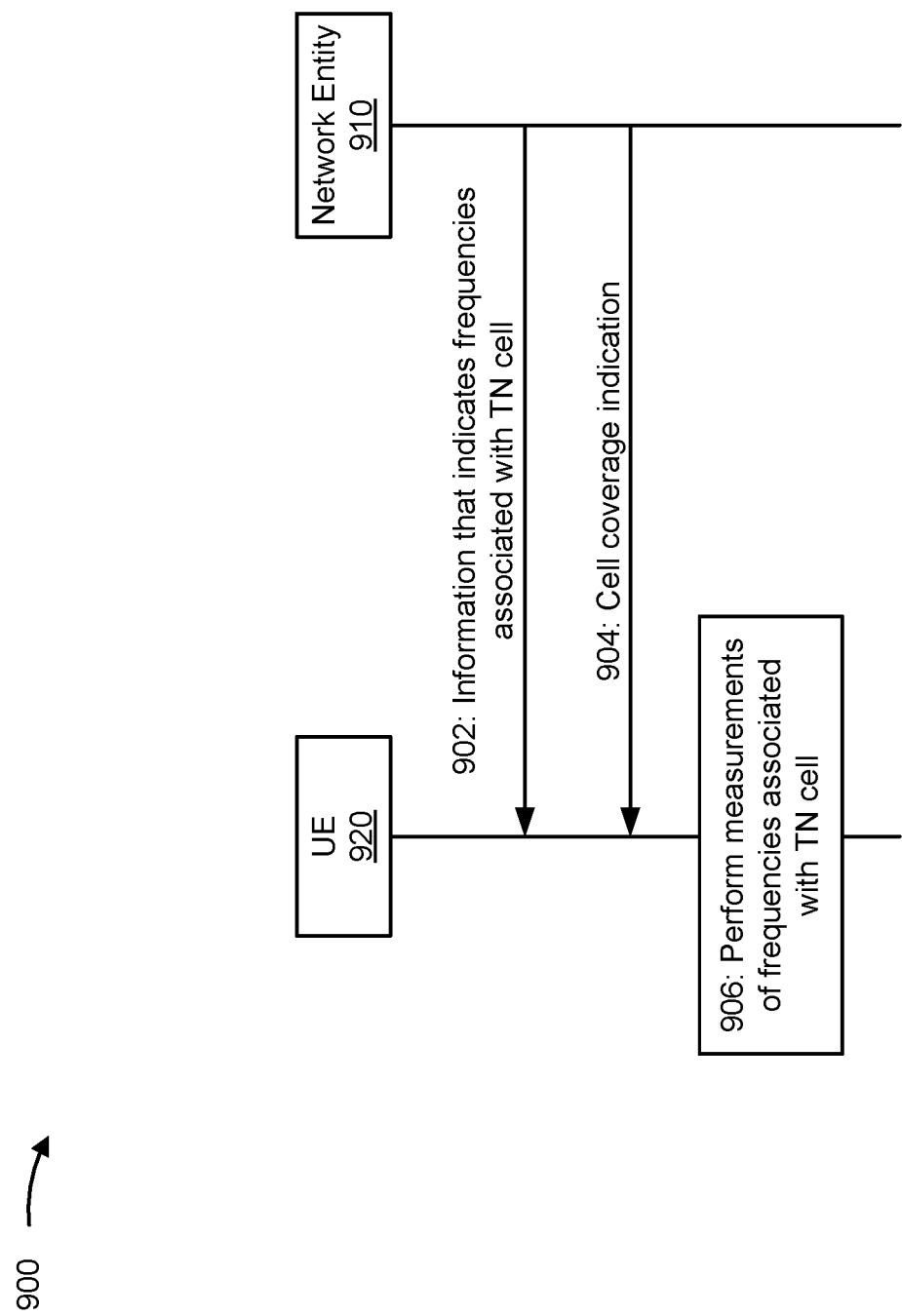

FIG. 9 is a diagram illustrating an example associated with performing measurements of frequencies associated with TN cells 900, in accordance with the present disclosure. As shown in FIG. 9, communication may occur between a UE 920 (e.g., UE 120) and a network entity 910 (e.g., base station 110). In some aspects, the UE 920 and the network entity 910 may be included in a wireless network, such as wireless network 100.

As shown by reference number 902, the UE 920 may receive, from the network entity 910, an indication of frequencies associated with a TN cell. The UE 920 may receive a SIB that includes the indication of frequencies associated with the TN cell. For example, the SIB may include a list of the frequencies associated with the TN cell.

As shown by reference number 904, the UE 920 may receive, from the network entity 910, a cell coverage indication. The UE 920 may receive the cell coverage indication in system information via a broadcast from the network entity 910. The cell coverage indication may include information regarding a plurality of sub-areas within a cell. The information regarding the plurality of sub-areas within the cell May be a bitmap, where each bit of the bitmap may be associated with a specific sub-area of the plurality of sub-areas. The cell coverage indication may indicate a cell reference point of the cell and a radius of the cell. The cell coverage indication may indicate the plurality of sub-areas within the cell using one or more directions, one or more angles, and/or one or more zone identifiers.

In some aspects, the cell coverage indication may indicate, for each sub-area of the plurality of sub-areas, whether performing the measurements of the frequencies associated with the TN cell is enabled. For example, for a particular sub-area, the cell coverage indication may indicate a value of "0" when performing the measurements of the frequencies associated with the TN cell is not enabled, or a value of "1" when performing the measurements of the frequencies associated with the TN cell is enabled. The cell coverage indication may include information regarding a plurality of sub-areas within a cell. The cell coverage indication may indicate, for each sub-area of the plurality of sub-areas, whether performing the measurements of the frequencies associated with the TN cell is disabled. In some aspects, the UE 920 may discard the cell coverage indication after the UE 920 is no longer associated with the cell.

In some aspects, the UE 920 may receive, from the network entity 910, the cell coverage indication. The cell coverage indication may divide a cell coverage area into multiple sub-areas (or multiple parts). The multiple sub-areas may be indicated by different angles and/or zone identifiers. The UE 920 may receive the cell coverage indication after camping on a cell associated with the cell coverage indication. The UE 920 may receive the cell coverage indication in system information via a broadcast. The cell coverage indication may indicate a reference point (or center) of the cell and a radius associated with the cell. The cell coverage indication may indicate the multiple sub-areas (or directions) associated with the cell. The cell coverage indication may indicate whether a TN cell search should be enabled or disabled for each sub-area. "TN cell search" may refer to a search for frequencies associated with TN cells. The UE 920 may perform the TN cell search (e.g., measure frequencies associated with TN cells) based at least in part on the cell coverage indication. The cell coverage indication may be cell-specific, and when the UE 920 is no longer camped in the cell, the UE 920 may discard the cell coverage indication.

For example, the cell coverage indication may include the bitmap (e.g., a 4-bit bitmap) to indicate four parts of the cell, such as a northwest (NW) part, a northeast part (NE), a southwest (SW) part, and a southeast (SE) part. The bitmap may indicate, for each of the NW part, the NE part, the SW part, and the SE part, whether a TN cell search should be enabled or disabled. For example, a bitmap may indicate two sub-areas for which a TN cell search should be enabled, and three sub-areas for which a TN cell search should be disabled. As another example, the cell coverage indication may include a list of zone identifiers corresponding to zones in which a TN cell search is disabled, where the cell coverage indication may be provided by the network entity 910 to the UE 920 in a system information message or in a UE-specific dedicated signal.

In some aspects, the UE 920 may receive, from the network entity 910, an indication of inter-RAT information providing coverage to the UE 920, where the inter-RAT information may include information about NR RATs, LTE RATs, and/or GSM RATs. The UE 920 may use a priority scheme to select coverage other than NR (e.g., LTE or GSM), where the priority scheme may be signaled by the network entity 910 to the UE.

As shown by reference number 906, the UE 920 may perform, during an idle mode of the UE 920, measurements of the frequencies associated with the TN cell based at least in part on the cell coverage indication and a location of the UE 920 within one of the plurality of sub-areas within the cell. The UE 920 may determine, using the cell coverage indication, that the location of the UE 920 is within one of the plurality of sub-areas within the cell for which performing the measurements of the frequencies associated with the TN cell is enabled, and based at least in part on this determination, the UE 920 may perform the measurements of the frequencies associated with the TN cell.

As indicated above, FIG. 9 is provided as an example. Other examples may differ from what is described with regard to FIG. 9.

Figure 10:
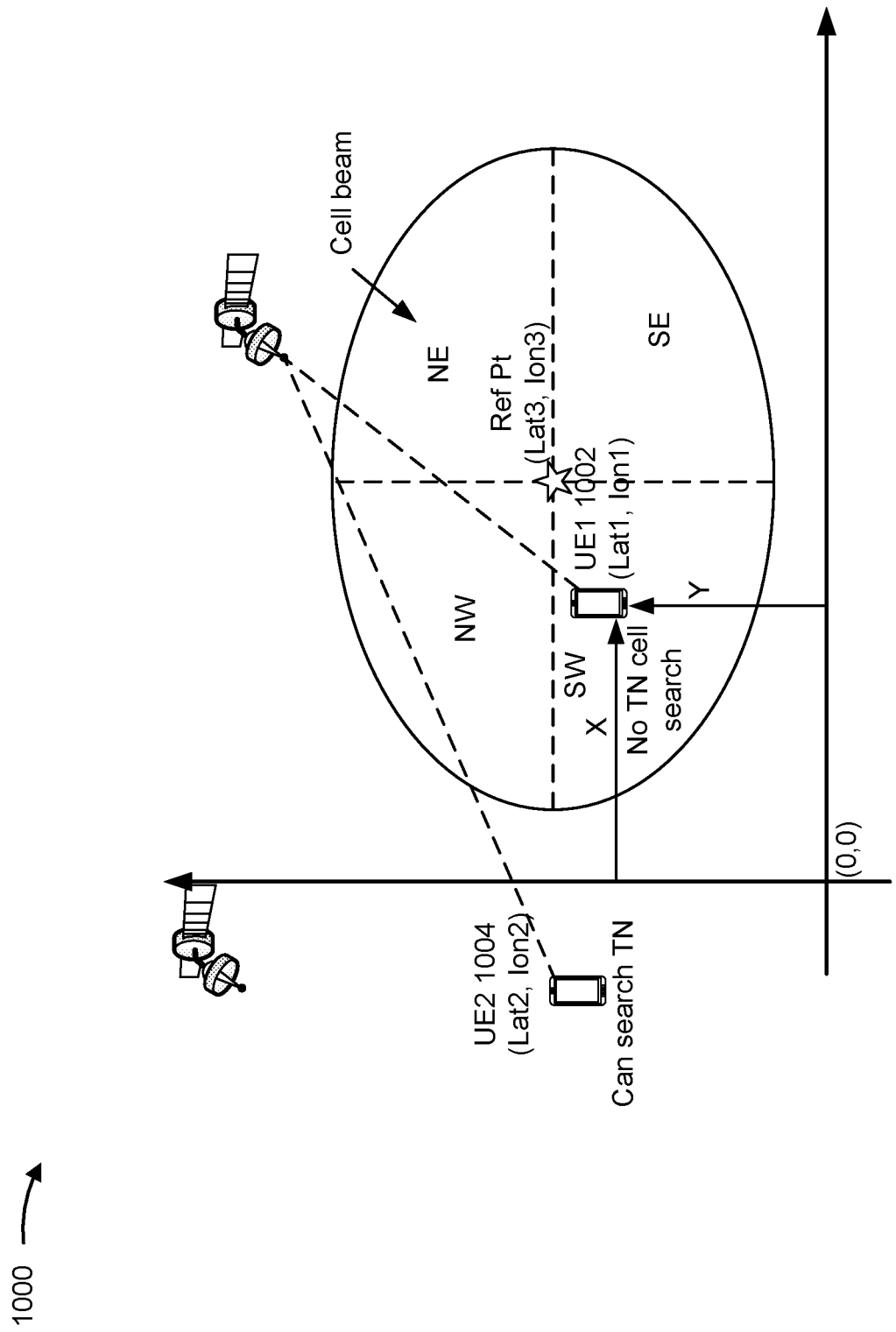

FIG. 10 is a diagram illustrating an example associated with performing measurements of frequencies associated with TN cells 1000, in accordance with the present disclosure.

As shown in FIG. 10, a cell coverage indication may divide a cell coverage area into multiple parts. The cell coverage indication may indicate a reference point (or center) of the cell and a radius associated with the cell. The reference point may be associated with coordinate information, such as a longitude and a latitude. The cell coverage indication may indicate the multiple parts associated with the cell. For example, the cell coverage indication may indicate that the cell is divided into a NW part, a NE part, a SW part, and a SE part. Further, for each part, the cell coverage indication may indicate whether a TN cell search should be enabled or disabled. The cell coverage indication may indicate, for a first UE 1002 (e.g., UE1) that is within a certain part of the cell coverage area (e.g., the SW part), that the TN cell search should be disabled due to no TN cell being present in that part of the cell coverage area. The first UE 1002 may be associated with a location (e.g., a longitude and a latitude) that is within the certain part of the cell coverage area. A second UE 1004 (e.g., UE2) that is outside of the cell coverage area may perform a TN cell search.

As indicated above, FIG. 10 is provided as an example. Other examples may differ from what is described with regard to FIG. 10.

Figure 11:
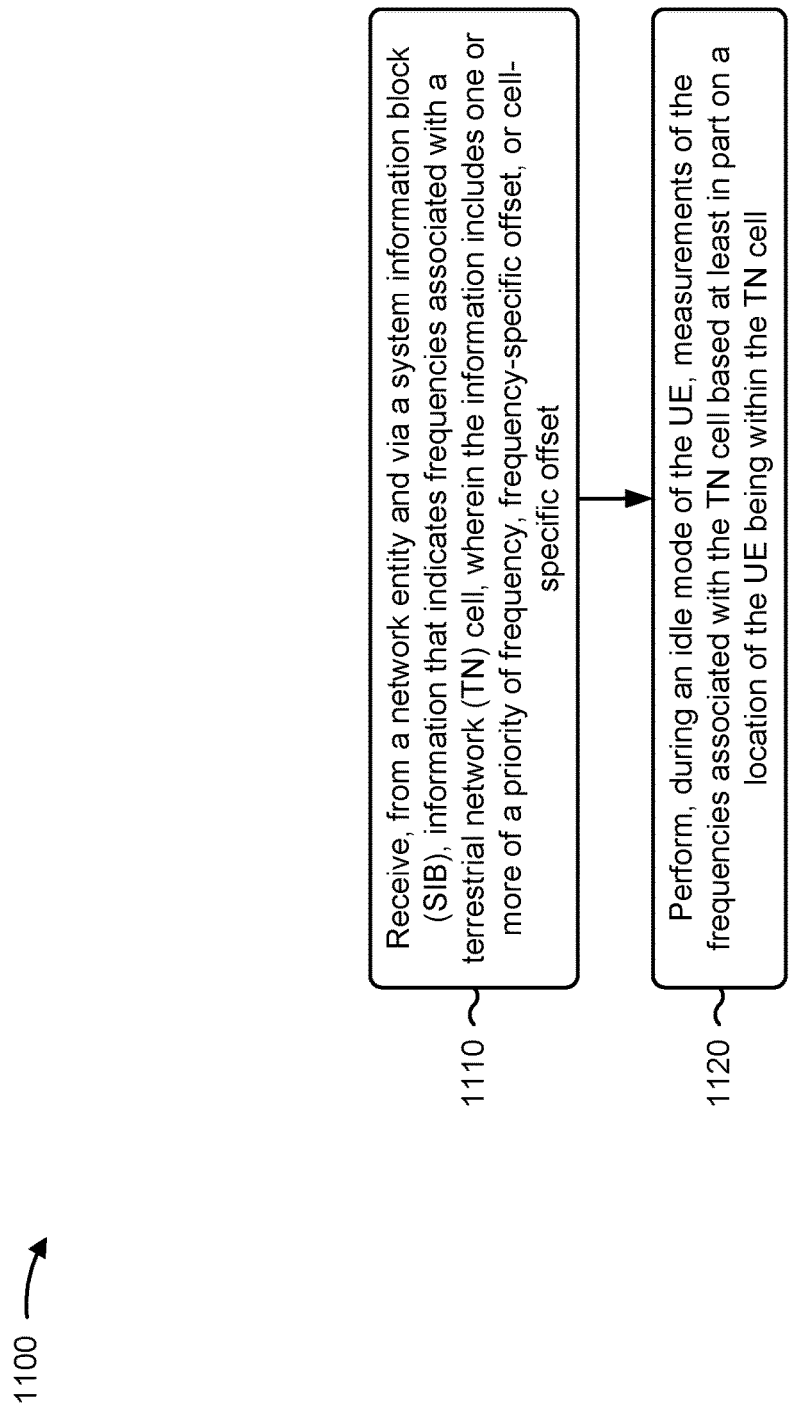
FIGS. 11-13 are diagrams illustrating example processes associated with performing measurements of frequencies associated with TN cells, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with performing measurements of frequencies associated with TN cells.

As shown in FIG. 11, in some aspects, process 1100 may include receiving, from a network entity and via a SIB, information that indicates frequencies associated with a TN cell, wherein the information includes one or more of a priority of frequency, frequency-specific offset, or cell-specific offset (block 1110). For example, the UE (e.g., using communication manager 140 and/or reception component 1402, depicted in FIG. 14) may receive, from a network entity and via a system information block (SIB), information that indicates frequencies associated with a terrestrial network (TN) cell, wherein the information includes one or more of a priority of frequency, frequency-specific offset, or cell-specific offset, as described above.

As further shown in FIG. 11, in some aspects, process 1100 may include performing, during an idle mode of the UE, measurements of the frequencies associated with the TN cell based at least in part on a location of the UE being within the TN cell (block 1120). For example, the UE (e.g., using communication manager 140 and/or measurement component 1408, depicted in FIG. 14) may perform, during an idle mode of the UE, measurements of the frequencies associated with the TN cell based at least in part on a location of the UE being within the TN cell, as described above.

Process 1100 may include additional aspects, such as any single aspect or any combination of aspects described below and/or in connection with one or more other processes described elsewhere herein.

In a first aspect, process 1100 includes receiving, from the network entity, TN cell coverage information that indicates coordinate information associated with the TN cell, wherein the location of the UE in relation to the TN cell is based at least in part on the TN cell coverage information.

In a second aspect, alone or in combination with the first aspect, the SIB is an NTN-specific SIB, wherein the information indicates a list of satellites and an index of frequencies, wherein frequencies from the index of frequencies that correspond to satellites from the list of satellites are indicative of frequencies associated with NTN cells, and the frequencies associated with the TN cell are derived based at least in part on the frequencies associated with NTN cells.

In a third aspect, alone or in combination with one or more of the first and second aspects, the SIB is a SIB3 or a SIB4, and the information is a list of the frequencies associated with the TN cell.

In a fourth aspect, alone or in combination with one or more of the first through third aspects, the information is a list of frequencies and corresponding priority values, and frequencies from the list of frequencies having priority values that satisfy a threshold correspond to the frequencies associated with the TN cells.

In a fifth aspect, alone or in combination with one or more of the first through fourth aspects, the information is a list of frequencies and corresponding sub-priority values, wherein the sub-priority values are used for the frequencies associated with the TN cell, and the sub-priority values are not used for frequencies associated with non-terrestrial network cells.

In a sixth aspect, alone or in combination with one or more of the first through fifth aspects, the information is a list of frequencies and corresponding offset ranges, wherein the offset ranges correspond to the frequency-specific offset or the cell-specific offset, and offset ranges that satisfy a threshold correspond to the frequencies associated with the TN cells.

In a seventh aspect, alone or in combination with one or more of the first through sixth aspects, the information indicates a RAT associated with the TN cell, and the measurements of the frequencies associated with the TN cell are based at least in part on the RAT associated with the TN cell being supported by the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
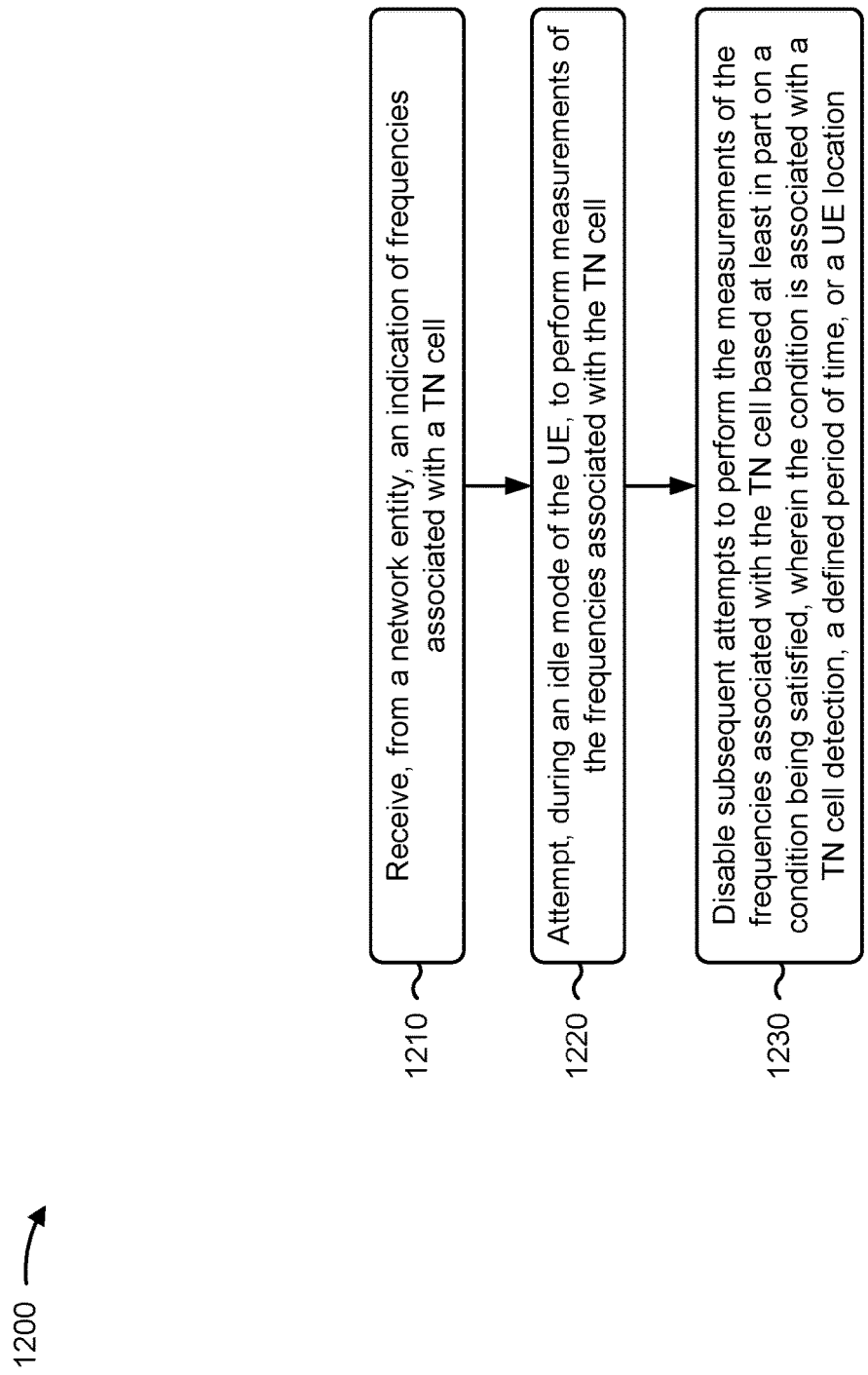

FIG. 12 is a diagram illustrating an example process 1200 performed, for example, by a UE, in accordance with the present disclosure. Example process 1200 is an example where the UE (e.g., UE 120) performs operations associated with performing measurements of frequencies associated with TN cells.

As shown in FIG. 12, in some aspects, process 1200 may include receiving, from a network entity, an indication of frequencies associated with a TN cell (block 1210). For example, the UE (e.g., using communication manager 140 and/or reception component 1402, depicted in FIG. 14) may receive, from a network entity, an indication of frequencies associated with a TN cell, as described above.

As further shown in FIG. 12, in some aspects, process 1200 may include attempting, during an idle mode of the UE, to perform measurements of the frequencies associated with the TN cell (block 1220). For example, the UE (e.g., using communication manager 140 and/or measurement component 1408, depicted in FIG. 14) may attempt, during an idle mode of the UE, to perform measurements of the frequencies associated with the TN cell, as described above.

As further shown in FIG. 12, in some aspects, process 1200 may include disabling subsequent attempts to perform the measurements of the frequencies associated with the TN cell based at least in part on a condition being satisfied, wherein the condition is associated with one or more of a TN cell detection, a defined period of time, or a UE location (block 1230). For example, the UE (e.g., using communication manager 140 and/or measurement component 1408, depicted in FIG. 14) may disable subsequent attempts to perform the measurements of the frequencies associated with the TN cell based at least in part on a condition being satisfied, wherein the condition is associated with one or more of a TN cell detection, a defined period of time, or a UE location, as described above.

Process 1200 may include additional aspects, such as any single aspect or any combination of aspects described below and/or in connection with one or more other processes described elsewhere herein.

In a first aspect, attempting to perform the measurements of the frequencies associated with the TN cell is based at least in part on whether an SSB is detected within the frequencies associated with the TN cell.

In a second aspect, alone or in combination with the first aspect, process 1200 includes disabling the subsequent attempts based at least in part on the TN cell not being detected after a defined quantity of attempts.

In a third aspect, alone or in combination with one or more of the first and second aspects, process 1200 includes disabling the subsequent attempts based at least in part on the TN cell not being detected after a defined quantity of DRX cycles.

In a fourth aspect, alone or in combination with one or more of the first through third aspects, process 1200 includes disabling the subsequent attempts for a defined period of time.

In a fifth aspect, alone or in combination with one or more of the first through fourth aspects, process 1200 includes disabling the subsequent attempts until the UE moves a distance that satisfies a threshold.

In a sixth aspect, alone or in combination with one or more of the first through fifth aspects, process 1200 includes reattempting to perform measurements of the frequencies associated with the TN cell based at least in part on a second condition being satisfied, wherein the second condition is satisfied based at least in part on an expiry of the defined period of time or the UE moving a distance to the UE location that satisfies a threshold.

In a seventh aspect, alone or in combination with one or more of the first through sixth aspects, process 1200 includes performing the measurements of the frequencies associated with the TN cell based at least in part on a relaxed TN cell search procedure, wherein the relaxed TN cell search procedure involves disabling the subsequent attempts to perform the measurements of the frequencies associated with the TN cell regardless of the frequencies associated with the TN cell being associated with a high priority.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
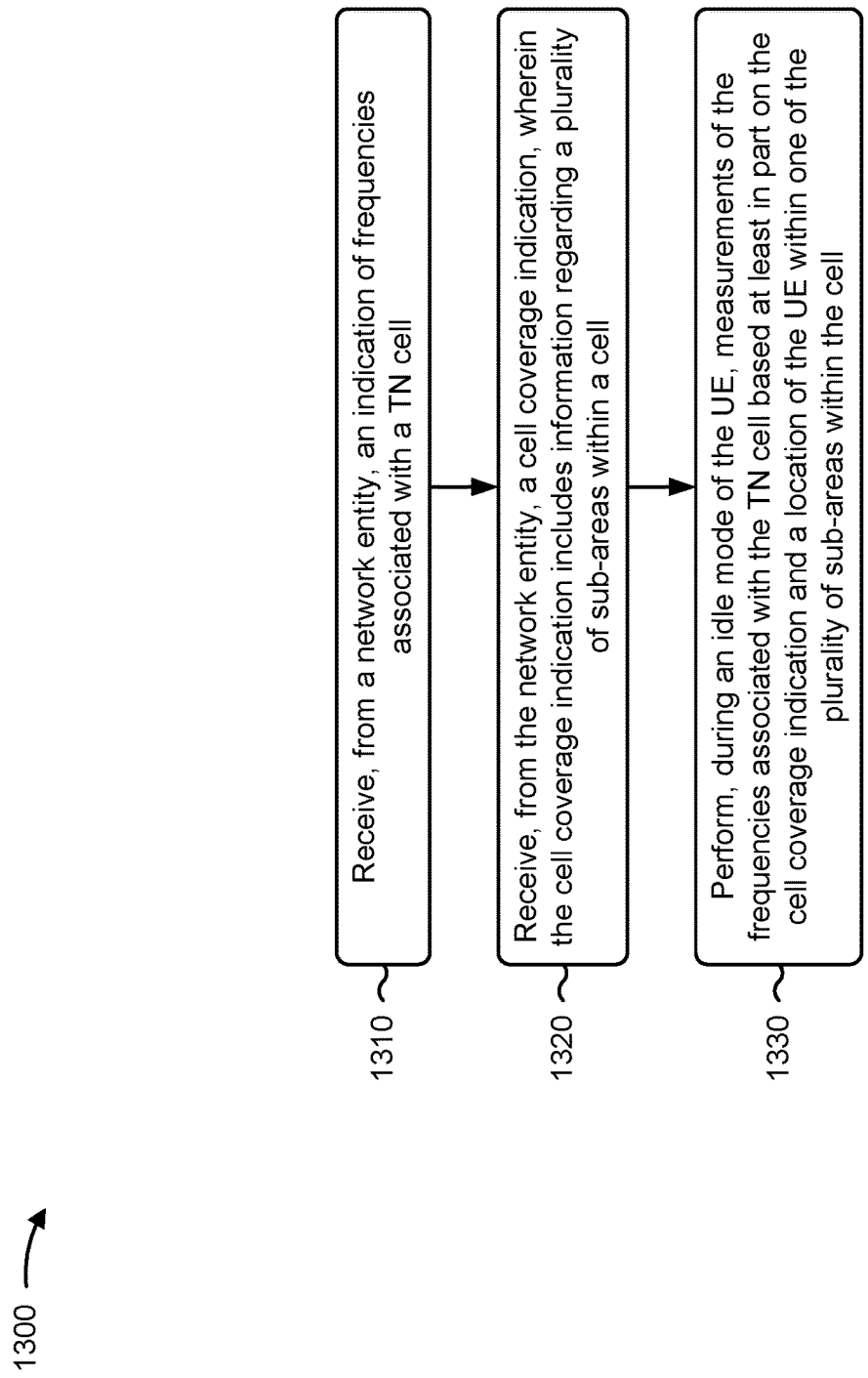

FIG. 13 is a diagram illustrating an example process 1300 performed, for example, by a UE, in accordance with the present disclosure. Example process 1300 is an example where the UE (e.g., UE 120) performs operations associated with performing measurements of frequencies associated with TN cells.

As shown in FIG. 13, in some aspects, process 1300 may include receiving, from a network entity, an indication of frequencies associated with a TN cell (block 1310). For example, the UE (e.g., using communication manager 140 and/or reception component 1402, depicted in FIG. 14) may receive, from a network entity, an indication of frequencies associated with a TN cell, as described above.

As further shown in FIG. 13, in some aspects, process 1300 may include receiving, from the network entity, a cell coverage indication, wherein the cell coverage indication includes information regarding a plurality of sub-areas within a cell (block 1320). For example, the UE (e.g., using communication manager 140 and/or reception component 1402, depicted in FIG. 14) may receive, from the network entity, a cell coverage indication, wherein the cell coverage indication includes information regarding a plurality of sub-areas within a cell, as described above.

As further shown in FIG. 13, in some aspects, process 1300 may include performing, during an idle mode of the UE, measurements of the frequencies associated with the TN cell based at least in part on the cell coverage indication and a location of the UE within one of the plurality of sub-areas within the cell (block 1330). For example, the UE (e.g., using communication manager 140 and/or measurement component 1408, depicted in FIG. 14) may perform, during an idle mode of the UE, measurements of the frequencies associated with the TN cell based at least in part on the cell coverage indication and a location of the UE within one of the plurality of sub-areas within the cell, as described above.

Process 1300 may include additional aspects, such as any single aspect or any combination of aspects described below and/or in connection with one or more other processes described elsewhere herein.

In a first aspect, the cell coverage indication indicates, for each sub-area of the plurality of sub-areas, whether performing the measurements of the frequencies associated with the TN cell is enabled.

In a second aspect, alone or in combination with the first aspect, the cell coverage indication indicates, for each sub-area of the plurality of sub-areas, whether performing the measurements of the frequencies associated with the TN cell is disabled.

In a third aspect, alone or in combination with one or more of the first and second aspects, process 1300 includes receiving the cell coverage indication in system information via a broadcast from the network entity.

In a fourth aspect, alone or in combination with one or more of the first through third aspects, the cell coverage indication indicates a cell reference point of the cell and a radius of the cell.

In a fifth aspect, alone or in combination with one or more of the first through fourth aspects, the cell coverage indication indicates the plurality of sub-areas within the cell using one or more directions, one or more angles, or one or more zone identifiers.

In a sixth aspect, alone or in combination with one or more of the first through fifth aspects, process 1300 includes discarding the cell coverage indication after the UE is no longer associated with the cell.

In a seventh aspect, alone or in combination with one or more of the first through sixth aspects, the information regarding the plurality of sub-areas within the cell is a bitmap, and each bit of the bitmap is associated with a specific sub-area of the plurality of sub-areas.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
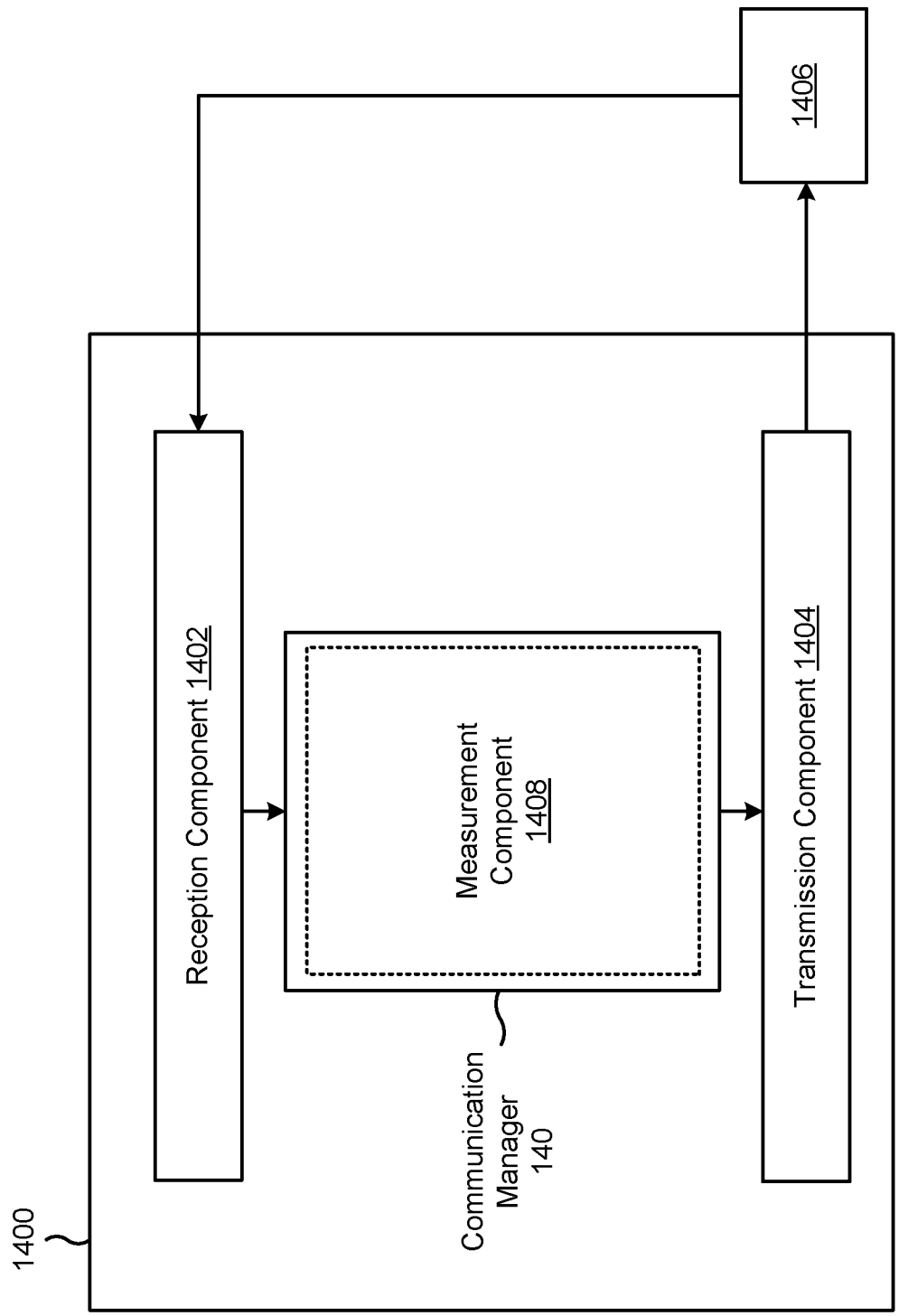
FIG. 14 is a diagram of an example apparatus for wireless communication, in accordance with the present disclosure.

FIG. 14 is a diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a measurement component 1408, among other examples.

In some aspects, the apparatus 1400 may be configured to perform one or more operations described herein in connection with FIGS. 7-10. Additionally, or alternatively, the apparatus 1400 may be configured to perform one or more processes described herein, such as process 1100 of FIG. 11, process 1200 of FIG. 12, process 1300 of FIG. 13, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The reception component 1402 may receive, from a network entity and via a SIB, information that indicates frequencies associated with a TN cell, wherein the information includes one or more of a priority of frequency, frequency-specific offset, or cell-specific offset. The measurement component 1408 may perform, during an idle mode of the UE, measurements of the frequencies associated with the TN cell based at least in part on a location of the UE being within the TN cell. The reception component 1402 may receive, from the network entity, TN cell coverage information that indicates coordinate information associated with the TN cell, wherein the location of the UE in relation to the TN cell is based at least in part on the TN cell coverage information.

The reception component 1402 may receive, from a network entity, an indication of frequencies associated with a TN cell. The measurement component 1408 may attempt, during an idle mode of the UE, to perform measurements of the frequencies associated with the TN cell. The measurement component 1408 may disable subsequent attempts to perform the measurements of the frequencies associated with the TN cell based at least in part on a condition being satisfied, wherein the condition is associated with one or more of a TN cell detection, a defined period of time, or a UE location.

The measurement component 1408 may perform the measurements of the frequencies associated with the TN cell based at least in part on a relaxed TN cell search procedure, wherein the relaxed TN cell search procedure involves disabling the subsequent attempts to perform the measurements of the frequencies associated with the TN cell regardless of the frequencies associated with the TN cell being associated with a high priority.

The reception component 1402 may receive, from a network entity, an indication of frequencies associated with a TN cell. The reception component 1402 may receive, from the network entity, a cell coverage indication, wherein the cell coverage indication includes information regarding a plurality of sub-areas within a cell. The measurement component 1408 may perform, during an idle mode of the UE, measurements of the frequencies associated with the TN cell based at least in part on the cell coverage indication and a location of the UE within one of the plurality of sub-areas within the cell.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a network entity and via a system information block (SIB), information that indicates frequencies associated with a terrestrial network (TN) cell, wherein the information includes one or more of a priority of frequency, frequency-specific offset, or cell-specific offset; and performing, during an idle mode of the UE, measurements of the frequencies associated with the TN cell based at least in part on a location of the UE being within the TN cell.

Aspect 2: The method of Aspect 1, further comprising: receiving, from the network entity, TN cell coverage information that indicates coordinate information associated with the TN cell, wherein the location of the UE in relation to the TN cell is based at least in part on the TN cell coverage information.

Aspect 3: The method of any of Aspects 1 through 2, wherein the SIB is a non-terrestrial network (NTN)-specific SIB, wherein the information indicates a list of satellites and an index of frequencies, wherein frequencies from the index of frequencies that correspond to satellites from the list of satellites are indicative of frequencies associated with NTN cells, and wherein the frequencies associated with the TN cell are derived based at least in part on the frequencies associated with NTN cells.

Aspect 4: The method of any of Aspects 1 through 3, wherein the SIB is a SIB type 3 or a SIB type 4, and wherein the information is a list of the frequencies associated with the TN cell.

Aspect 5: The method of any of Aspects 1 through 4, wherein the information is a list of frequencies and corresponding priority values, and wherein frequencies from the list of frequencies having priority values that satisfy a threshold correspond to the frequencies associated with the TN cells.

Aspect 6: The method of any of Aspects 1 through 5, wherein the information is a list of frequencies and corresponding sub-priority values, wherein the sub-priority values are used for the frequencies associated with the TN cell, and wherein the sub-priority values are not used for frequencies associated with non-terrestrial network cells.

Aspect 7: The method of any of Aspects 1 through 6, wherein the information is a list of frequencies and corresponding offset ranges, wherein the offset ranges correspond to the frequency-specific offset or the cell-specific offset, and wherein offset ranges that satisfy a threshold correspond to the frequencies associated with the TN cells.

Aspect 8: The method of any of Aspects 1 through 7, wherein the information indicates a radio access technology (RAT) associated with the TN cell, and wherein the measurements of the frequencies associated with the TN cell are based at least in part on the RAT associated with the TN cell being supported by the UE.

Aspect 9: A method of wireless communication performed by a user equipment (UE), comprising: receiving, from a network entity, an indication of frequencies associated with a terrestrial network (TN) cell; attempting, during an idle mode of the UE, to perform measurements of the frequencies associated with the TN cell; and disabling subsequent attempts to perform the measurements of the frequencies associated with the TN cell based at least in part on a condition being satisfied, wherein the condition is associated with one or more of a TN cell detection, a defined period of time, or a UE location.

Aspect 10: The method of Aspect 9, wherein attempting to perform the measurements of the frequencies associated with the TN cell is based at least in part on whether a synchronization signal block is detected within the frequencies associated with the TN cell.

Aspect 11: The method of any of Aspects 9 through 10, wherein disabling the subsequent attempts based at least in part on the TN cell not being detected after a defined quantity of attempts.

Aspect 12: The method of any of Aspects 9 through 11, wherein disabling the subsequent attempts based at least in part on the TN cell not being detected after a defined quantity of DRX cycles.

Aspect 13: The method of any of Aspects 9 through 12, wherein disabling the subsequent attempts comprises disabling the subsequent attempts for a defined period of time.

Aspect 14: The method of any of Aspects 9 through 13, wherein disabling the subsequent attempts comprises disabling the subsequent attempts until the UE moves a distance that satisfies a threshold.

Aspect 15: The method of any of Aspects 9 through 14, further comprising: reattempting to perform measurements of the frequencies associated with the TN cell based at least in part on a second condition being satisfied, wherein the second condition is satisfied based at least in part on an expiry of the defined period of time or the UE moving a distance to the UE location that satisfies a threshold.

Aspect 16: The method of any of Aspects 9 through 15, further comprising: performing the measurements of the frequencies associated with the TN cell based at least in part on a relaxed TN cell search procedure, wherein the relaxed TN cell search procedure involves disabling the subsequent attempts to perform the measurements of the frequencies associated with the TN cell regardless of the frequencies associated with the TN cell being associated with a high priority.

Aspect 17: A method of wireless communication performed by a user equipment (UE), comprising: receiving, from a network entity, an indication of frequencies associated with a terrestrial network (TN) cell; receiving, from the network entity, a cell coverage indication, wherein the cell coverage indication includes information regarding a plurality of sub-areas within a cell; and performing, during an idle mode of the UE, measurements of the frequencies associated with the TN cell based at least in part on the cell coverage indication and a location of the UE within one of the plurality of sub-areas within the cell.

Aspect 18: The method of Aspect 17, wherein the cell coverage indication indicates, for each sub-area of the plurality of sub-areas, whether performing the measurements of the frequencies associated with the TN cell is enabled.

Aspect 19: The method of any of Aspects 17 through 18, wherein the cell coverage indication indicates, for each sub-area of the plurality of sub-areas, whether performing the measurements of the frequencies associated with the TN cell is disabled.

Aspect 20: The method of any of Aspects 17 through 19, wherein receiving the cell coverage indication comprises receiving the cell coverage indication in system information via a broadcast from the network entity.

Aspect 21: The method of any of Aspects 17 through 20, wherein the cell coverage indication indicates a cell reference point of the cell and a radius of the cell.

Aspect 22: The method of any of Aspects 17 through 21, wherein the cell coverage indication indicates the plurality of sub-areas within the cell using: one or more directions, one or more angles, or one or more zone identifiers.

Aspect 23: The method of any of Aspects 17 through 22, further comprising: discarding the cell coverage indication after the UE is no longer associated with the cell.

Aspect 24: The method of any of Aspects 17 through 23, wherein the information regarding the plurality of sub-areas within the cell is a bitmap, and wherein each bit of the bitmap is associated with a specific sub-area of the plurality of sub-areas.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a network entity and via a system information block (SIB), information that indicates frequencies associated with a terrestrial network (TN) cell, wherein the information includes one or more of a priority of frequency, frequency-specific offset, or cell-specific offset, wherein the information indicates a list of satellites and an index of frequencies, and wherein frequencies from the index of frequencies that correspond to satellites from the list of satellites are indicative of frequencies associated with non-terrestrial network (NTN) cells;
      receive TN cell coverage information that indicates one or more of cell coordinates for the TN cell, a cell radius for the TN cell, or a cell center for the TN cell; and
      perform, during an idle mode of the UE and when the UE is located within an NTN cell, measurements of the frequencies associated with the TN cell based at least in part on a location of the UE being within the TN cell.

2. The apparatus of claim 1, wherein the one or more processors are further configured to:
   receive the TN cell coverage information from the network entity, wherein the location of the UE in relation to the TN cell is based at least in part on the TN cell coverage information.

3. The apparatus of claim 1, wherein the SIB is an NTN-specific SIB, and wherein the frequencies associated with the TN cell are derived based at least in part on the frequencies associated with the NTN cells.

4. The apparatus of claim 1, wherein the SIB is a SIB type 3 or a SIB type 4, and wherein the information is a list of the frequencies associated with the TN cell.

5. The apparatus of claim 1, wherein the information is a list of frequencies and corresponding priority values, and wherein frequencies from the list of frequencies having priority values that satisfy a threshold correspond to the frequencies associated with the NTN cells.

6. The apparatus of claim 1, wherein the information is a list of frequencies and corresponding sub-priority values, wherein the corresponding sub-priority values are used for the frequencies associated with the TN cell, and wherein the corresponding sub-priority values are not used for the frequencies associated with NTN cells.

7. The apparatus of claim 1, wherein the information is a list of frequencies and corresponding offset ranges, wherein the corresponding offset ranges correspond to the frequency-specific offset or the cell-specific offset, and wherein offset ranges that satisfy a threshold correspond to the frequencies associated with the NTN cells.

8. The apparatus of claim 1, wherein the information indicates a radio access technology (RAT) associated with the TN cell, and wherein the measurements of the frequencies associated with the TN cell are based at least in part on the RAT associated with the TN cell being supported by the UE.

9. An apparatus for wireless communication at a user equipment (UE), comprising:
one or more memories; and
one or more processors, coupled to the one or more memories, configured to:
receive, from a network entity, information that indicates frequencies associated with a terrestrial network (TN) cell, wherein the information indicates a list of satellites and an index of frequencies, and wherein frequencies from the index of frequencies that correspond to satellites from the list of satellites are indicative of frequencies associated with non-terrestrial network (NTN) cells;
receive TN cell coverage information that indicates one or more of cell coordinates for the TN cell, a cell radius for the TN cell, or a cell center for the TN cell;
attempt, during an idle mode of the UE and when the UE is located within an NTN cell, to perform measurements of the frequencies associated with the TN cell based at least in part on a location of the UE being within the TN cell; and
disable subsequent attempts to perform the measurements of the frequencies associated with the TN cell based at least in part on a condition being satisfied, wherein the condition is associated with one or more of a TN cell detection, a defined period of time, or a UE location.

10. The apparatus of claim 9, wherein the one or more processors are configured to attempt to perform the measurements of the frequencies associated with the TN cell based at least in part on whether a synchronization signal block is detected within the frequencies associated with the TN cell.

11. The apparatus of claim 9, wherein the one or more processors are configured to disable the subsequent attempts based at least in part on the TN cell not being detected after a defined quantity of attempts.

12. The apparatus of claim 9, wherein the one or more processors are configured to disable the subsequent attempts based at least in part on the TN cell not being detected after a defined quantity of discontinuous reception cycles.

13. The apparatus of claim 9, wherein the one or more processors are configured to disable the subsequent attempts for the defined period of time.

14. The apparatus of claim 9, wherein the one or more processors are configured to disable the subsequent attempts until the UE moves a distance that satisfies a threshold.

15. The apparatus of claim 9, wherein the one or more processors are further configured to:
reattempt to perform the measurements of the frequencies associated with the TN cell based at least in part on a second condition being satisfied, wherein the second condition is satisfied based at least in part on an expiry of the defined period of time or the UE moving a distance to the UE location that satisfies a threshold.

16. The apparatus of claim 9, wherein the one or more processors are further configured to:
perform the measurements of the frequencies associated with the TN cell based at least in part on a relaxed TN cell search procedure, wherein the relaxed TN cell search procedure involves disabling the subsequent attempts to perform the measurements of the frequencies associated with the TN cell regardless of the frequencies associated with the TN cell being associated with a high priority.

17. An apparatus for wireless communication at a user equipment (UE), comprising:
one or more memories; and
one or more processors, coupled to the one or more memories, configured to:
receive, from a network entity, information indicating frequencies associated with a terrestrial network (TN) cell, wherein the information indicates a list of satellites and an index of frequencies, and wherein frequencies from the index of frequencies that correspond to satellites from the list of satellites are indicative of frequencies associated with non-terrestrial network (NTN) cells;
receive, from the network entity, cell information, wherein the cell information indicates one or more of information regarding a plurality of sub-areas within a cell, cell coordinates for the cell, a cell radius for the cell, or a cell center for the cell; and
perform, during an idle mode of the UE and when the UE is located within an NTN cell, measurements of the frequencies associated with the TN cell based at least in part on the cell information and a location of the UE within one of the plurality of sub-areas within the cell.

18. The apparatus of claim 17, wherein the cell information indicates, for each sub-area of the plurality of sub-areas, whether performing the measurements of the frequencies associated with the TN cell is enabled.

19. The apparatus of claim 17, wherein the cell information indicates, for each sub-area of the plurality of sub-areas, whether performing the measurements of the frequencies associated with the TN cell is disabled.

20. The apparatus of claim 17, wherein the one or more processors are configured to receive the cell information in system information via a broadcast from the network entity.

21. The apparatus of claim 17, wherein the cell information indicates a cell reference point of the cell and the cell radius of the cell.

22. The apparatus of claim 17, wherein the cell information indicates the plurality of sub-areas within the cell using: one or more directions, one or more angles, or one or more zone identifiers.

23. The apparatus of claim 17, wherein the one or more processors are further configured to:
discard the cell information after the UE is no longer associated with the cell.

24. The apparatus of claim 17, wherein the information regarding the plurality of sub-areas within the cell is a bitmap, and wherein each bit of the bitmap is associated with a specific sub-area of the plurality of sub-areas.

25. A method of wireless communication performed by a user equipment (UE), comprising:
receiving, from a network entity and via a system information block (SIB), information that indicates frequencies associated with a terrestrial network (TN) cell, wherein the information includes one or more of a priority of frequency, frequency-specific offset, or cell-specific offset, wherein the information indicates a list of satellites and an index of frequencies, and wherein frequencies from the index of frequencies that correspond to satellites from the list of satellites are indicative of frequencies associated with non-terrestrial network (NTN) cells;
receiving TN cell coverage information that indicates one or more of cell coordinates for the TN cell, a cell radius for the TN cell, or a cell center for the TN cell; and
performing, during an idle mode of the UE and when the UE is located within an NTN cell, measurements of the frequencies associated with the TN cell based at least in part on a location of the UE being within the TN cell.

26. The method of claim 25, further comprising:
receiving the TN cell coverage information from the network entity, wherein the location of the UE in relation to the TN cell is based at least in part on the TN cell coverage information.

27. The method of claim 25, wherein the SIB is an NTN-specific SIB, and wherein the frequencies associated with the TN cell are derived based at least in part on the frequencies associated with the NTN cells.

28. The method of claim 25, wherein the SIB is a SIB type 3 or a SIB type 4, and wherein the information is a list of the frequencies associated with the TN cell.

29. The method of claim 25, wherein:
the information is a list of frequencies and corresponding priority values, and wherein frequencies from the list of frequencies having priority values that satisfy a threshold correspond to the frequencies associated with the NTN cells; or
the information is the list of frequencies and corresponding sub-priority values, wherein the corresponding sub-priority values are used for the frequencies associated with the TN cell, and wherein the corresponding sub-priority values are not used for frequencies associated with NTN cells.

30. The method of claim 25, wherein:
the information is a list of frequencies and corresponding offset ranges, wherein the corresponding offset ranges correspond to frequency-specific offsets or cell-specific offsets, and wherein offset ranges that satisfy a threshold correspond to the frequencies associated with the TN cell; or
the information indicates a radio access technology (RAT) associated with the TN cell, and wherein the measurements of the frequencies associated with the TN cell are based at least in part on the RAT associated with the TN cell being supported by the UE.

* * * * *